(12) United States Patent
Arsenault et al.

(10) Patent No.: US 11,297,672 B2
(45) Date of Patent: *Apr. 5, 2022

(54) METHODS AND SYSTEMS FOR ENABLING END-USER EQUIPMENT AT AN END-USER PREMISE TO EFFECT COMMUNICATIONS WHEN AN ABILITY OF THE END-USER EQUIPMENT TO COMMUNICATE VIA A COMMUNICATION LINK CONNECTING THE END-USER EQUIPMENT TO A COMMUNICATIONS NETWORK IS DISRUPTED

(71) Applicant: BCE INC., Verdun (CA)

(72) Inventors: Jonathan Allan Arsenault, Orleans (CA); David William Clark, Carp (CA); Eric John Wolf, Stittsville (CA); Sean MacLean Murray, Ottawa (CA)

(73) Assignee: BCE INC., Verdun (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,587

(22) Filed: Jun. 13, 2017

(65) Prior Publication Data

US 2017/0290081 A1 Oct. 5, 2017

Related U.S. Application Data

(63) Continuation of application No. 13/138,031, filed as application No. PCT/CA2008/002282 on Dec. 23, 2008, now Pat. No. 9,681,485.

(51) Int. Cl.
| | | |
|---|---|---|
| *H04L 12/703* | (2013.01) | |
| *H04W 4/16* | (2009.01) | |
| *H04W 76/19* | (2018.01) | |
| *H04K 3/00* | (2006.01) | |
| *H04L 67/14* | (2022.01) | |
| *H04L 69/40* | (2022.01) | |
| *H04L 67/148* | (2022.01) | |

(52) U.S. Cl.
CPC ............ *H04W 76/19* (2018.02); *H04K 3/222* (2013.01); *H04K 3/226* (2013.01); *H04K 3/88* (2013.01);

(Continued)

(58) Field of Classification Search
CPC .......... H04K 2203/16; H04K 2203/18; H04K 3/222; H04K 3/226; H04K 3/88;

(Continued)

(56) References Cited

U.S. PATENT DOCUMENTS 7,983,670 B1 * 7/2011 Elliott ................... H04W 24/04
455/426.2
8,543,098 B2 * 9/2013 Tischer ............... H04L 65/1069
455/414.4

(Continued)

*Primary Examiner* — Kevin C. Harper
*Assistant Examiner* — Derrick V Rose

(57) ABSTRACT

A method for effecting communications, such as telephone calls, accesses to data network sites, alarm system communications, and/or other communications, over a communications network. The method comprises: determining that an ability of first end-user equipment at a first end-user premise to communicate via a first communication link connecting the first end-user equipment to the communications network is disrupted; establishing a wireless communication link between the first end-user equipment and second end-user equipment at a second end-user premise; and causing information transmitted by or destined for the first end-user equipment to be exchanged over the communications network via the wireless communication link and a second communication link connecting the second end-user equipment to the communications network. Also provided are apparatus and computer-readable media containing a program element executable by a computing system to perform such a method.

19 Claims, 8 Drawing Sheets

(52) U.S. Cl.
CPC ............ *H04L 67/14* (2013.01); *H04L 67/148* (2013.01); *H04L 69/40* (2013.01); *H04K 2203/16* (2013.01); *H04K 2203/18* (2013.01)

(58) Field of Classification Search
CPC ....... H04L 67/14; H04L 67/148; H04L 69/40; H04W 76/19
See application file for complete search history.

(56) References Cited

U.S. PATENT DOCUMENTS

| | | | | |
|---|---|---|---|---|
| 9,049,576 | B2* | 6/2015 | Arsenault | H04L 41/5054 |
| 9,681,485 | B2* | 6/2017 | Arsenault | H04L 67/148 |
| 2002/0181485 | A1* | 12/2002 | Cao | H04J 3/14 |
| | | | | 370/419 |
| 2003/0043792 | A1* | 3/2003 | Carpini | H04L 45/00 |
| | | | | 370/386 |
| 2003/0063613 | A1* | 4/2003 | Carpini | H04L 45/02 |
| | | | | 370/401 |
| 2007/0032230 | A1* | 2/2007 | Pregont | H04W 76/025 |
| | | | | 455/421 |
| 2007/0053306 | A1* | 3/2007 | Stevens | G06F 21/43 |
| | | | | 370/252 |
| 2008/0235778 | A1* | 9/2008 | Fratti | H04L 63/0869 |
| | | | | 726/8 |
| 2009/0257345 | A1* | 10/2009 | King | H04L 41/22 |
| | | | | 370/216 |
| 2010/0157849 | A1* | 6/2010 | Klausberger | H04L 12/2898 |
| | | | | 370/254 |
| 2010/0202450 | A1* | 8/2010 | Ansari | G06Q 30/04 |
| | | | | 370/389 |

\* cited by examiner

METHODS AND SYSTEMS FOR ENABLING END-USER EQUIPMENT AT AN END-USER PREMISE TO EFFECT COMMUNICATIONS WHEN AN ABILITY OF THE END-USER EQUIPMENT TO COMMUNICATE VIA A COMMUNICATION LINK CONNECTING THE END-USER EQUIPMENT TO A COMMUNICATIONS NETWORK IS DISRUPTED

CROSS REFERENCE TO RELATED APPLICATIONS

The current application is a Continuation of U.S. patent application Ser. No. 13/138,031, filed Sep. 20, 2011, which is a National Phase entry of International Application No. PCT/CA2008/002282, filed Dec. 23, 2008, both of which are incorporated by reference herein in their entirety.

FIELD OF THE INVENTION

The invention relates generally to telecommunications and, more particularly, to methods and systems for enabling end-user equipment at an end-user premise to effect communications when an ability of the end-user equipment to communicate via a communication link connecting the end-user equipment to a communications network is disrupted.

BACKGROUND

End-user premises such as residences or other buildings (or parts thereof) can be equipped with various pieces of equipment, including phones, computers, alarm system devices and/or other devices (e.g., television units), which can be used to effect telephone calls, accesses to data network sites (e.g., websites), alarm system communications, and/or other communications (e.g., television signals, etc.).

Communications effected by end-user equipment at a given end-user premise take place over a communication link, such as a metallic twisted-pair cable, a coaxial cable, an optic fiber cable, or a wireless link, which reaches the given end-user premise and connects the end-user equipment to a communications network. In some situations, an ability of the end-user equipment to communicate via the communication link can be disrupted. For example, in some cases, the communication link can be disrupted, for instance, due to a cut or other physical damage inflicted (accidentally or maliciously) to the communication link or to any other condition preventing the communication link from operating normally.

In other cases, software and/or hardware (e.g., a modem) of the end-user equipment used by the end-user equipment to effect communications via the communication link can be disrupted, for instance, due to a defective or inoperative component. In such situations, it may no longer be possible for the end-user equipment to effect telephone calls, accesses to data network sites, alarm system communications, and/or other communications via the communication link.

Accordingly, there exists a need for solutions enabling end-user equipment at an end-user premise to effect telephone calls, accesses to data network sites, alarm system communications, and/or other communications when an ability of the end-user equipment to communicate via a communication link connecting the end-user equipment to a communications network is disrupted.

SUMMARY OF THE INVENTION

According to a first broad aspect, the invention provides a method for effecting communications over a communications network. The method comprises: determining that an ability of first end-user equipment at a first end-user premise to communicate via a first communication link connecting the first end-user equipment to the communications network is disrupted; establishing a wireless communication link between the first end-user equipment and second end-user equipment at a second end-user premise; and causing information transmitted by or destined for the first end-user equipment to be exchanged over the communications network via the wireless communication link and a second communication link connecting the second end-user equipment to the communications network.

According to a second broad aspect, the invention provides apparatus for effecting communications over a communications network. The apparatus comprises a processing entity configured to determine that an ability of first end-user equipment at a first end-user premise to communicate via a first communication link connecting the first end-user equipment to the communications network is disrupted. The apparatus also comprises a routing entity configured to: establish a wireless communication link between the first end-user equipment and second end-user equipment at a second end-user premise; and cause information transmitted by or destined for the first end-user equipment to be exchanged over the communications network via the wireless communication link and a second communication link connecting the second end-user equipment to the communications network.

According to a third broad aspect, the invention provides computer-readable media containing a program element executable by a computing system to perform a method for effecting communications over a communications network. The program element comprises: program code for causing the computing system to determine that an ability of first end-user equipment at a first end-user premise to communicate via a first communication link connecting the first end-user equipment to the communications network is disrupted; program code for causing the computing system to establish a wireless communication link between the first end-user equipment and second end-user equipment at a second end-user premise; and program code for causing the computing system to cause information transmitted by or destined for the first end-user equipment to be exchanged over the communications network via the wireless communication link and a second communication link connecting the second end-user equipment to the communications network.

These and other aspects of the invention will become apparent to those of ordinary skill in the art upon review of the following description of example embodiments of the invention in conjunction with the accompanying drawings.

BRIEF DESCRIPTION OF THE DRAWINGS

A detailed description of certain embodiments of the invention is provided herein below, by way of example only, with reference to the accompanying drawings, in which.

It is to be expressly understood that the description and drawings are only for the purpose of illustration of example embodiments of the invention and are an aid for understanding. They are not intended to be a definition of the limits of the invention.

DETAILED DESCRIPTION OF EMBODIMENTS

Figure 1:
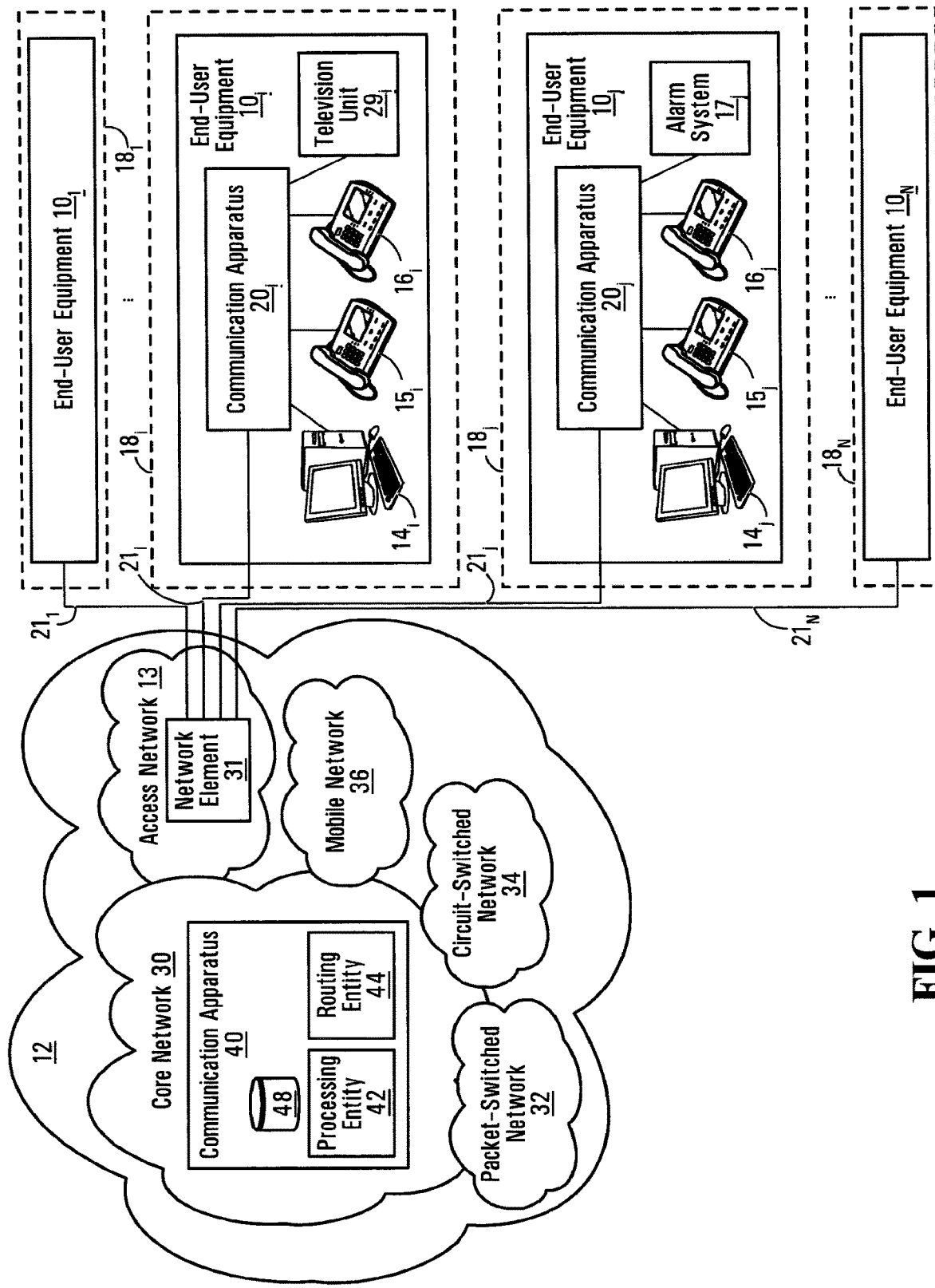
FIG. 1 shows an example of an architecture comprising a communications network allowing end-user equipment located at respective end-user premises to effect various communications, in accordance with an embodiment of the invention.

FIG. 1 shows an example of an architecture comprising a communications network 12 allowing end-user equipment $10_I$-$10_N$ located at respective end-user premises $18_I$ $18_N$ to effect various communications, including telephone calls, accesses to data network sites (e.g., websites), alarm system communications, and/or other communications (e.g., television signals), in accordance with an embodiment of the invention. Each of the end-user premises $18_I$-$18_N$ may be a residence (such as a house or an apartment) or other building (or a part thereof).

The end-user equipment $10_x$ (1≤x≤N) at the end-user premise $18_x$ is connected to the communications network 12 via a respective one of a plurality of communication links $21_I$-$21_N$ that reach corresponding ones of the end-user premises $18_I$-$18_N$. In this embodiment, the communication links $21_I$-$21_N$ are part of an access network 13 that is provided by a service provider providing communication services to the end-user premises $18_I$-$18_N$. The access network 13 leads to a core network 30 provided by the service provider to enable the end-user equipment $10_I$-$10_N$ at the end-user premises $18_I$-$18_N$ SN to effect communications over various networks of the communications network 12, including a packet-switched network 32 (e.g., the Internet), a circuit-switched network 34 (e.g., the Public Switched Telephone Network (PSTN)) and a mobile network 36 (e.g., a Global System for Mobile Communications (GSM) network or other cellular network).

More particularly, in this embodiment, each of the communication links $21_I$-$21_N$ comprises a metallic twisted-pair cable (e.g., a copper twisted-pair cable) or a coaxial cable that is connected to a network element 31 of the access network 13. Also, in this embodiment, the access network 13 is based on a fiber-to-the-node or neighborhood (FTTN) infrastructure such that the network element 31 comprises a FTTN platform (e.g., an Alcatel 7330 Intelligent Services Access Manager (ISAM) Fiber to the Node (FTTN) platform) which, in addition to being connected to the communication links $21_I$-$21_N$, is connected to optical fiber cabling of the access network 13. The optical fiber cabling is connected to other components of the access network 13 (e.g., one or more routers or switches, an optical Ethernet network, etc.) that interface with the core network 30.

The access network 13 and the communication links $21_I$-$21_N$ may be implemented in various other ways in other embodiments. For example, in some embodiments, the access network 13 may be based on a fiber-to-the-curb (FTTC) infrastructure and the network element 31 may be a FTTC platform. In other embodiments, the network element 31 may be omitted depending on the nature of the access network 13. For example, in some embodiments, the access network 13 may be based on a fiber-to-the-premises (FTTP) infrastructure (e.g., fiber-to-the-building (FTTB) or fiber-to-the-house (FTTH) infrastructures) in which case the communication links $21_I$-$21_N$ may comprise optical fiber cables leading to optical network terminals (ONTs) that may be part of the end-user equipment $10_I$-$10_N$ at the end-user premises $18_I$-$18_N$. In yet other embodiments, the communication links $21_I$-$21_N$ may comprise a wireless link portion (e.g., a WiMAX link, a satellite-based link, etc.).

The core network 30 comprises a communication apparatus 40 configured to perform various operations when a communication, such as a telephone call or an access to a data network site, is originated by, destined for, in progress at certain end-user equipment (such as any of the end-user equipment $10_I$-$10_N$). The communication apparatus 40 comprises suitable hardware, firmware, software or a combination thereof for implementing a plurality of functional entities, including a processing entity 42, a routing entity 44 and a database 48.

The processing entity 42 implements a processing logic to process communications originated by, destined for, or in progress at end-user equipment (such as any of the end-user equipment $10_I$-$10_N$). The processing logic may be defined by a sequence of decisions to be taken with respect to a given communication, which may lead to one or more actions being performed based on those decisions. Each decision taken with respect to the given communication may be based on one or more factors. One example of such a factor is an origin of the given communication which, for instance, may be specified by: a telephone number, an Internet Protocol (IP) address, a Uniform Resource Identifier (URI) (e.g., a Session Initiation Protocol (SIP) URI), and/or another identifier identifying a device that originated the given communication; a name or other identifier of a party that originated the given communication; a time at which the given communication was originated (e.g., a day, hour, minute, etc.); and/or a location (e.g., a civic address) where the given communication was originated. Another example of such a factor is a destination of the given communication which, for instance, may be specified by: a telephone number, an IP address, a URI (e.g., a SIP URI), and/or another identifier identifying a device for which the given communication is destined; a name or other identifier of a party for which the given communication is destined; and/or a location (e.g., a civic address) for which the given communication is destined. In some cases, a factor on which may be based a decision to be taken with respect to the given communication may also be defined in terms of certain information included in the database 48 that may be accessed by the processing entity 42 (e.g., where the given communication is a telephone call, certain information in the database 48 on how to process calls involving a party having originated the telephone call or for which the telephone call is destined may be used by the processing entity 42).

Figure 2:
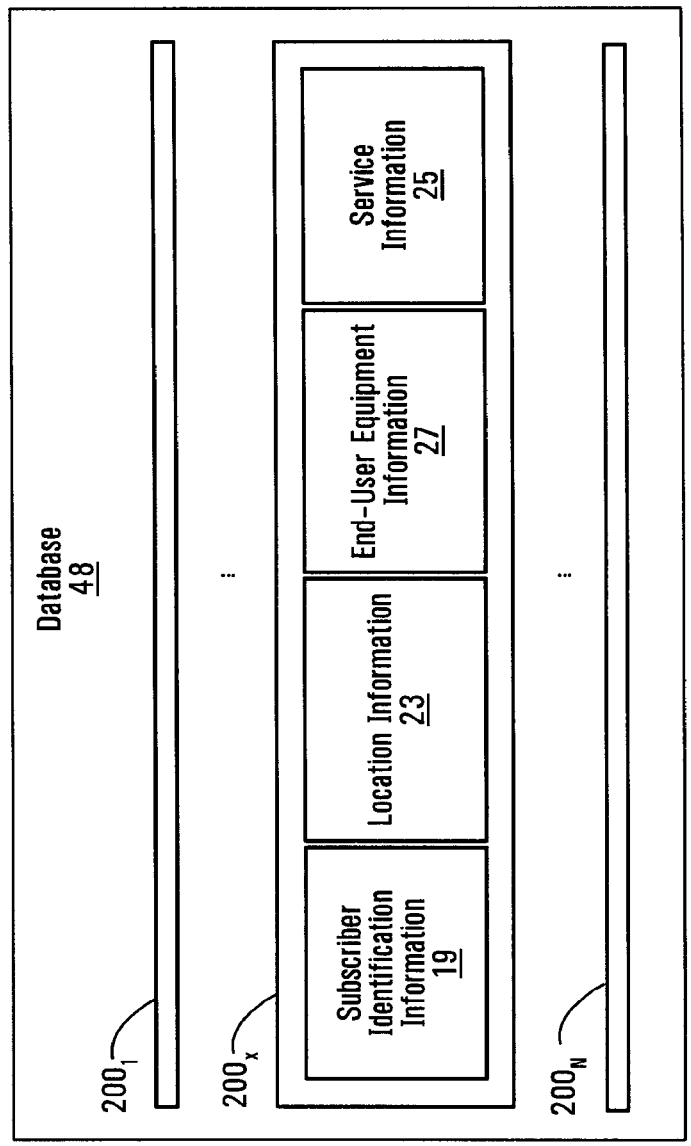
FIG. 2 shows an example of potential contents of a database of a communication apparatus of the communications network shown in FIG. 1.

FIG. 2 shows an example of potential contents of the database 48. In this example, the database 48 stores a plurality of records $200_1$-$200_N$, where each of these records is associated with a subscription to communication services provided by the service provider to a respective one of the end-user premises $18_1$-$18_N$. In other words, each of the end-user premises $18_1$-$18_N$ is associated with a different subscriber (i.e., a person or a group of persons) to which the service provider provides communication services. The database 48 may store other records associated with other subscriptions associated with other end-user premises which are served by the service provider.

The record $200_x$ is associated with the subscriber to which communication services are provided at the end-user premise $18_x$ and includes various types of information. More particularly, in this example, the record $200_x$ includes:

subscriber identification information 19 identifying the subscriber. For example, the subscriber identification information 19 may include an account number (e.g., a phone number) and/or another subscriber identifier (e.g., a name);

location information 23 indicating a physical location of the end-user premise 18X. For example, the location information 23 may include a civic address, a set of geo-coordinates, and/or any other information that indicates the physical location of the end-user premise $18_x$;

end-user equipment information 27 regarding the end-user equipment $10_x$ at the end-user premises $18_x$, which includes information regarding each of one or more pieces of equipment of the end-user equipment $10_x$. For example, the information regarding a given piece of equipment of the end-user equipment $10_x$ may include an identifier of the given piece of equipment, such as: a Media Access Control (MAC) address, an Ethernet hardware address (EHA), or another hardware identifier of the given piece of equipment; an IP address assigned to the given piece of equipment; a URI (e.g., a SIP URI) identifying the given piece of equipment; or any other information that identifies the given piece of equipment. The end-user equipment information 27 may also include additional information that concerns the end-user equipment $10_x$ at the end-user premise $18_x$, examples of which will be discussed later on; and service information 25 regarding one or more communication services provided to the subscriber by the service provider. For example, the service information 25 may comprise call processing information that is related to processing of calls destined for or originated by the subscriber and that is used by the communication apparatus 40 to process such calls. In some cases, the call processing information may relate to one or more telephony features (e.g., call forwarding, call waiting, calling line identification (CLID) display, etc.) that may be subscribed to by the subscriber.

While this example illustrates certain information that can be included in the records $200_1$-$200_N$ of the database 48, various other information may be included in these records in other embodiments. In addition, while it is depicted in FIG. 1 as being one component, the database 48 may be distributed in nature. For example, in some embodiments, the database 48 can have portions of its content stored in different data storage media possibly located in different components of the communication apparatus 40 that are linked by one or more physical (i.e., wired or wireless) links.

The routing entity 44 is operative to cause one or more actions to be performed based on one or more decisions taken by the processing entity 42 with respect to a given communication, such as route information conveyed by the given communication to a certain piece of equipment which may be, for instance, a certain end-user device or a certain network element (e.g., a router). For example, the routing entity 44 may cause information conveyed by the given communication to be routed via the packet-switched network 32, the circuit-switched network 34, or the mobile network 36. To that end, the routing entity 44 may interact with one or more gateways interfacing with the packet-switched network 32, the circuit-switched network 34, and the mobile network 36

In some embodiments, the processing entity 42, the routing entity 44 and the database 48 may be implemented by a common network component. For example, in some embodiments, the processing entity 42, the routing entity 44 and the database 48 may be implemented by a Softswitch or other computer platform. Alternatively, in other embodiments, the processing entity 42, the routing entity 44 and the database 48 may be implemented by two or more different network components that are linked by one or more physical (i.e., wired or wireless) links. For example, in some embodiments, the processing entity 42, the routing entity 44 and the database 48 may be implemented by two or more softswitches or other computer platforms.

The end-user equipment $10_x$ at the end-user premise $18_x$ comprises various pieces of equipment that can be used to effect communications, including telephone calls, accesses to data network sites, alarm system communications, and/or other communications (e.g., television signals). More particularly, the end-user equipment $10_x$ at the end-user premise $18_x$ comprises one or more end-user devices configured to effect communications, such as: one or more telephones, each of which may be, for instance, a wired Plain Old Telephony System (POTS) phone (including a cordless phone), a Voice-over-Internet Protocol (VoIP) phone, a POTS phone equipped with an analog terminal adapter (ATA), a softphone (i.e., a computer equipped with telephony software), or a telephony-enabled television unit (e.g., a set-top box connected to a television and a remote control); one or more computers, each of which may comprise, for instance, a desktop computer, a laptop computer or another personal computer (PC); one or more alarm system devices of an alarm system (sometimes also referred to as a "security system"), each of which may comprise, for instance, a door or window opening detector, a smoke detector, a motion detector, a glass break detector and/or another detector, a controller, and/or another piece of equipment of the alarm system; and/or one or more other end-user devices (e.g., a television unit).

Also, in this embodiment, the end-user equipment $10_x$ at the end-user premise $18_x$ comprises a communication apparatus $20_x$ that is connected to the one or more end-user devices at the end-user premise $18_x$ and to the communication link $21_x$ reaching the end-user premise $18_x$ in order to allow these one or more end-user devices to communicate over the communications network 12 via the communication link $21_x$. The communication apparatus $20_x$ at the end-user premise $18_x$ can thus be viewed as a communications center or hub through which communications originated by, destined for, or in progress at the one or more end-user devices at the end-user premise $18_x$ are effected via the communication link $21_x$ reaching the end-user premise $18_x$.

In some situations, an ability of the end-user equipment $10_x$ to communicate via the communication link $21_x$ can be disrupted (i.e., not normal). For example, in some cases, the communication link $21_x$ can be disrupted, for instance, due to a cut or other physical damage inflicted (accidentally or maliciously) to the communication link $21_x$ (e.g., to a metallic twisted-pair or coaxial cable thereof), a defective or inoperative port of the network element 31 to which the communication link $21_x$ is connected, or any other condition preventing the communication link $21_x$ from operating normally. In other cases, software and/or hardware (e.g., a modem) of the end-user equipment $10_x$ used by the end-user equipment $10_x$ to effect communications via the communication link $21_x$ can be disrupted, for instance, due to a defective or inoperative component. In such situations, it may no longer be possible for the end-user equipment $10_x$ to effect telephone calls, accesses to data network sites, alarm system communications, and/or other communications via the communication link $21_x$ reaching the end-user premise $18_x$.

In accordance with an embodiment of the invention, and as further discussed below, when an ability of the end-user equipment $10_x$ to communicate via the communication link $21_x$ reaching the end-user premise $18_x$ is determined to be disrupted, the communication apparatus $20_x$ of the end-user equipment $10_x$ at the end-user premise $18_x$ can cause a wireless communication link to be established between the end-user equipment $10_x$ and the end-user equipment $10_y$ ($1 \leq y \leq N$; $y \neq x$) at the end-user premise $18_y$ in order to allow the end-user equipment $10_x$ to effect communications over the communications network 12 via this wireless communication link and the communication link $21_y$ reaching the end-user premise $18_y$. This provides a failover mechanism that enables the end-user equipment $10_x$ at the end-user premise $18_x$ to continue to be able to effect telephone calls, accesses to data network sites, alarm system communications, and/or other communications over the communications network 12 despite its ability to communicate via the communication link $21_x$ being disrupted. In other words, despite the ability of the end-user equipment $10_x$ to communicate via the communication link $21_x$ being disrupted, the end-user equipment $10_x$ at the end-user premise $18_x$ continues to be able to effect telephone calls, accesses to data network sites, alarm system communications, and/or other communications over the communications network 12 by "piggybacking" on the communication link $21_y$ reaching the end-user premise $18_y$.

Figure 3:
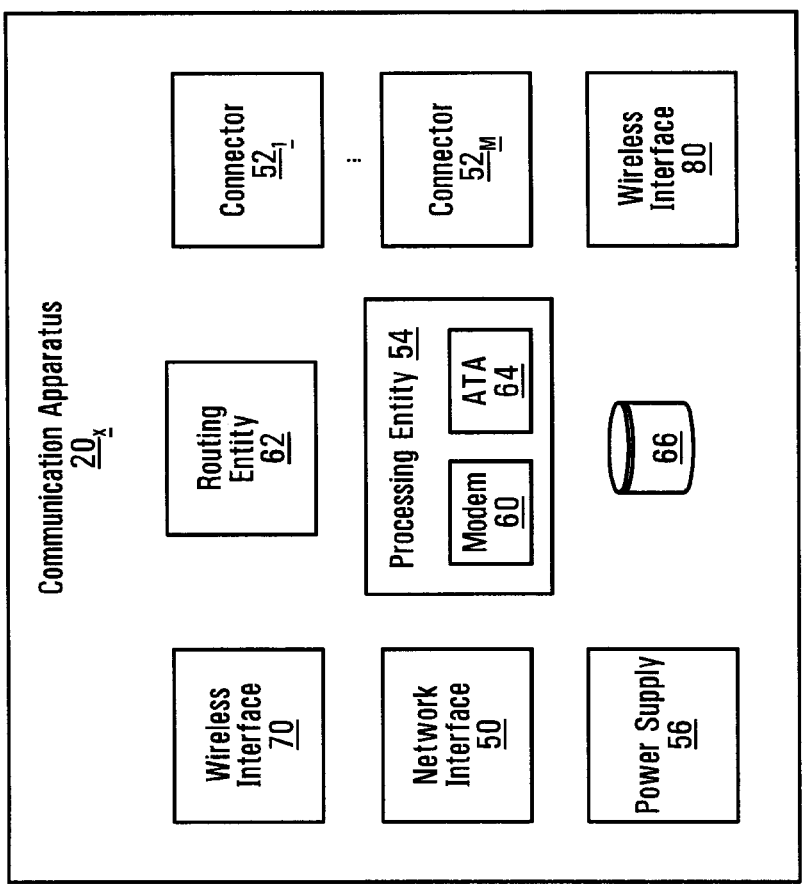
FIG. 3 shows a communication apparatus of the end-user equipment located at one of the end-user premises shown in FIG. 1.

With additional reference to FIG. 3, the communication apparatus $20_x$ of the end-user equipment $10_x$ at the end-user premise $18_x$ comprises suitable hardware, firmware, software or a combination thereof for implementing a plurality of functional entities, including, in this embodiment, a network interface 50, a plurality of connectors $52_1$-$52_M$, a wireless interface 80, a wireless interface 70, a processing entity 54, a routing entity 62, a database 66, and a power supply 56. In some embodiments, these entities of the communication apparatus $20_x$ may be integrated into a terminal installed at a suitable location (e.g., a basement or other location) at the end-user premise $18_x$. In other embodiments, these entities of the communication apparatus $20_x$ may be part of two or more devices interconnected to one another via one or more physical links.

The network interface 50 is connected to the communication link $21_x$ reaching the end-user premise $18_x$ in order to provide an interface between the end-user equipment $10_x$ and the communications network 12. For example, in some embodiments, the network interface 50 may be implemented by a network interface device (NID) and a channel service unit/data service unit (CSU/DSU). In other embodiments, the network interface 50 may be implemented in various other manners depending on the nature of the communication link $21_x$.

The connectors $52_1$-$52_M$ enable connection of one or more end-user devices of the end-user equipment $10_x$ to the communication apparatus $20_x$. For example, individual ones of the connectors $52_1$-$52_M$ may be an RJ11 connector (e.g., for connecting a wired POTS phone), an RJ45 connector (e.g., for connecting a computer or a VoIP phone) or any other type of connector (e.g., a connector for connecting to a television set-top box, a connector for connecting to an alarm system device, etc.).

The wireless interface 80 is configured to wirelessly exchange information with one or more end-user devices of the end-user equipment $10_x$ at that end-user premise $18_x$. More particularly, the wireless interface 80 comprises a wireless transmitter and a wireless receiver to wirelessly exchange information with one or more end-user devices of the end-user equipment $10_x$. For example, in some embodiments, the wireless interface 80 may be implemented by a wireless router based on WiFi (IEEE 802.11) technology or other wireless communication technologies.

The wireless interface 70 is configured to establish a wireless communication link between the end-user equipment $10_x$ at the end-user premise $18_x$ and the end-user equipment $10_y$ at the end-user premise $18_y$, when the ability of the end-user equipment $10_x$ to communicate via the communication link $21_x$ reaching the end-user premise $18_x$ is determined to be disrupted. More particularly, the wireless interface 70 comprises a wireless transmitter and a wireless receiver to wirelessly exchange information with the end-user equipment $10_y$ at the end-user premise $18_y$, For example, in some embodiments, the wireless interface 70 may be based on WiFi technology or other wireless communication technologies.

The processing entity 54 is configured to receive requests for communications originated by one or more end-user devices of the end-user equipment $10_x$. For example, the processing entity 54 may receive a request for a telephone call originated by a telephone of the end-user equipment $10_x$, a request for an access to a data network site originated by a computer of the end-user equipment $10_x$, a request for an alarm system communication originated by an alarm system device, and/or a request for another type of communication originated by another end-user device of the end-user equipment $10_x$.

The processing entity 54 is also configured to process information pertaining to communications effected by the end-user equipment $10_x$. More particularly, in this embodiment, the processing entity 54 comprises a modem 60 and an analog telephony adapter (ATA) 64. The modem 60 is configured to modulate an analog carrier signal to encode digital information for transmission via the network interface 50 and to demodulate an analog carrier signal received via the network interface 50 to decode information it conveys. For example, in some embodiments, the modem 60 may be a digital subscriber line (DSL) modem or a cable modem, depending on the nature of the communication link $21_x$. The ATA 64 is configured to convert analog telephony signals from any wired POTS phone that may be part of the end-user equipment $10_x$ and connected to one of the connectors $52_1$-$52_M$ into digital information to be processed by the routing entity 62 and the modem 60, and vice versa.

The processing entity 54 is also configured to determine whether the ability of the end-user equipment $10_x$ to communicate via the communication link $21_x$ is disrupted. For example, in this embodiment, the processing entity 54 may monitor the network interface 50 to detect a disruption of the communication link 21$_x$ (e.g., detect that no signal is received or transmittable by the network interface 50 via the communication link 21$_x$ or detect that a signal received via the communication link 21$_x$ at the network interface 50 fails to meet certain quality-of-service criteria). The processing entity 54 may also monitor software and/or hardware of the communication apparatus 20$_x$ to detect a defective or inoperative component (e.g., detect that the modem 60 is not operating normally). In other embodiments, the processing entity 54 may determine that the ability of the end-user equipment 10$_x$ to communicate via the communication link 21$_x$ is disrupted in various other ways, such as based on information received from a source external to the communication apparatus 20$_x$ and indicative of a disruption of the ability of the end-user equipment 10$_x$ to communicate via the communication link 21$_x$ (e.g., the communication apparatus 40 in the core network 30 may determine that the communication link 21$_x$ is disrupted and cause the end-user equipment 10$_y$ at the end-user premise 18$_y$ to transmit information received via the wireless interface 70 of the communication apparatus 20$_x$ at the end-user premise 18$_x$ and indicative of a disruption of the communication link 21$_x$).

The routing entity 62 is configured to cause information transmitted by or destined for the end-user equipment 10$_x$ to be exchanged over the communications network 12. More particularly, in this embodiment, when the ability of the end-user equipment 10$_x$ to communicate via the communication link 21$_x$ is normal (i.e., is not disrupted), the routing entity 62 routes information received via the connectors 52$_1$-52$_M$ and/or the wireless interface 80 towards the modem 60 for transmission via the network interface 50 and routes information received from the modem 60 towards the connectors 52$_1$ 52$_M$ and/or the wireless interface 80 for transmission to one or more end-user devices of the end-user equipment 10$_x$. However, when the ability of the end-user equipment 10$_x$ to communicate via the communication link 21$_x$ is determined to be disrupted (i.e., not normal), the routing entity 62 can cause the wireless interface 70 to establish a wireless communication link with the end-user equipment 10$_y$ at the end-user premise 18$_y$. The routing entity 62 can proceed to route information received via the connectors 52$_1$-52$_M$ and/or the wireless interface 80 towards the wireless interface 70 such that it is conveyed via the established wireless communication link, and to route information conveyed via the established wireless communication link and received via the wireless interface 70 towards the connectors 52$_1$-52$_M$ and/or the wireless interface 80 for transmission to one or more end-user devices of the end-user equipment 10$_x$.

Figure 4:
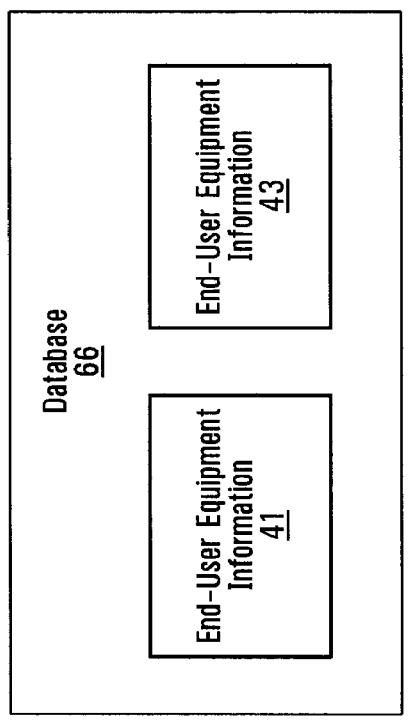
FIG. 4 shows an example of potential contents of a database of the communication apparatus shown in FIG. 3.

The database 66 stores information that can be used by the communication apparatus 20$_x$ in operation. FIG. 4 shows an example of potential contents of the database 66.

In this example, the database 66 stores end-user equipment information 41 regarding the end-user equipment 10$_x$, which includes information regarding each of one or more pieces of equipment of the end-user equipment 10$_x$ (e.g., the communication apparatus 20$_x$ and the one or more end-user devices at the end-user premise 18$_x$). More particularly, in this example, the information regarding a given piece of equipment of the end-user equipment 10$_x$ may include:
- an identifier of the given piece of equipment, such as a MAC address, EHA, or other hardware identifier of that piece of equipment, an IP address assigned to that piece of equipment, a URI (e.g., a SIP URI) identifying that piece of equipment, or any other information that identifies that piece of equipment; and
- depending on the nature of the given piece of equipment, access information to be provided to the given piece of equipment in order to access (i.e., make use of) that piece of equipment. For example, the access information for the given piece of equipment may comprise a code, such as a password or a wireless network key (e.g., a Wi-Fi Protected Access (WPA) key).

In addition, in this example, the database 66 stores end-user equipment information 43 regarding end-user equipment at one or more other ones of the end-user premises 18$_1$-18$_N$ that is within wireless range of the end-user equipment 10$_x$ at the end-user premise 18$_x$. For example, if the end-user equipment 10$_z$ ($1 \leq z \leq N$; $z \neq x$) at the end-user premise 18$_z$ is within wireless range of the end-user equipment 10$_x$ at the end-user premise 18$_x$, the end-user equipment information 43 may include information regarding each of one or more pieces of equipment of the end-user equipment 10$_z$ (e.g., the communication apparatus 20$_z$ and the one or more end-user devices at the end-user premise 18$_z$). For instance, the information regarding a given piece of equipment of the end-user equipment 10$_z$ may include: an identifier of the given piece of equipment such as a MAC address, EHA, or other hardware identifier of that piece of equipment, an IP address assigned to that piece of equipment, or any other information that identifies that piece of equipment; and, depending on the nature of the given piece of equipment, access information to be provided to the given piece of equipment in order to make use of that piece of equipment (e.g., a password or a wireless network key).

The end-user equipment information 41 regarding the end-user equipment 10$_x$ may be provided in the database 66 in various ways. For example, in some cases, the identifier of and/or access information for any piece of equipment of the end-user equipment 10$_x$ may be provided in the database 66 by a user at the end-user premise 18$_x$ when setting up that piece of equipment. In other cases, the identifier of and/or access information for any piece of equipment of the end-user equipment 10$_x$ may be provided in the database 66 by the service provider, for example, by the communication apparatus 40 transmitting this information via the communication link 21$_x$.

Similarly, the end-user equipment information 43 regarding end-user equipment at one or more other ones of the end-user premises 18$_1$-18$_N$ that is within wireless range of the end-user equipment 10$_x$ at the end-user premise 18$_x$ may be provided in the database 66 in various ways. For example, in some cases, the end-user equipment information 43 may be provided in the database 66 by the service provider, for example, by the communication apparatus 40 transmitting this information via the communication link 21$_x$. In other cases, the end-user equipment information 43 may be provided in the database 66 during a provisioning phase (e.g., when the communication apparatus 20$_x$ is initially set up at the end-user premise 18$_x$) using an exchange of information between the communication apparatus 20$_x$ at the end-user premise 18$_x$ and the communication apparatus at each of these one or more other ones of the end-user premises 18$_1$-18$_N$ that is within wireless range of the end-user equipment 10$_x$ at the end-user premise 18$_x$.

While this example illustrates certain information that can be included in the database 66, other information may be included in that database in other embodiments. Also, while it is depicted in FIG. 3 as being one component, the database 66 may be distributed in nature. For example, in some embodiments, the database 66 can have portions of its content stored in different data storage media of the communication apparatus 20$_x$.

The power supply 56 is configured to power the communication apparatus 20$_x$ using electrical power from an electrical network of the end-user premise 18$_x$. In addition, the power supply 56 is capable of powering the communication apparatus 20$_x$ in cases where the electrical network of the end-user premise 18$_x$ does not provide sufficient electrical power (including no electrical power at all) for operation of the communication apparatus 20$_x$ (e.g., due to a power outage or a malfunction in the electrical network). For example, the power supply 56 may comprise one or more batteries capable of powering the communication apparatus 20$_x$ for a prolonged period of time (e.g., several hours or a few days) before being depleted. The power supply 56 may also comprise charging circuitry for recharging the one or more batteries using electrical power from the electrical network of the end-user premise 18$_x$.

While they are shown as distinct entities, different ones of the functional entities of the communication apparatus 20$_x$ may be implemented by a common device. For example, the wireless interface 70 and the wireless interface 80 may be implemented by a common wireless router (e.g., a WiFi router). As another example, one or more of the connectors 52$_1$-52$_M$ and the ATA 64 may be implemented by a common ATA device. As yet another example, the modem 60 and the network interface 50 may be implemented by a common network interface device. As yet another example, the processing entity 54 and the routing entity 62 may be implemented by a common processing platform. As yet another example, the wireless interface 70, the wireless interface 80, the processing entity 54 and the routing entity 62 may be implemented by a common routing device.

Also, while the communication apparatus 20$_x$ is configured in a particular manner in this embodiment, the communication apparatus 20$_x$ may be configured in various manners in other embodiments. For example, in some embodiments, the ATA 64 may be omitted in cases where the end-user equipment 10$_x$ at the end-user premise 18$_x$ does not comprise any POTS phone.

Figure 5A:
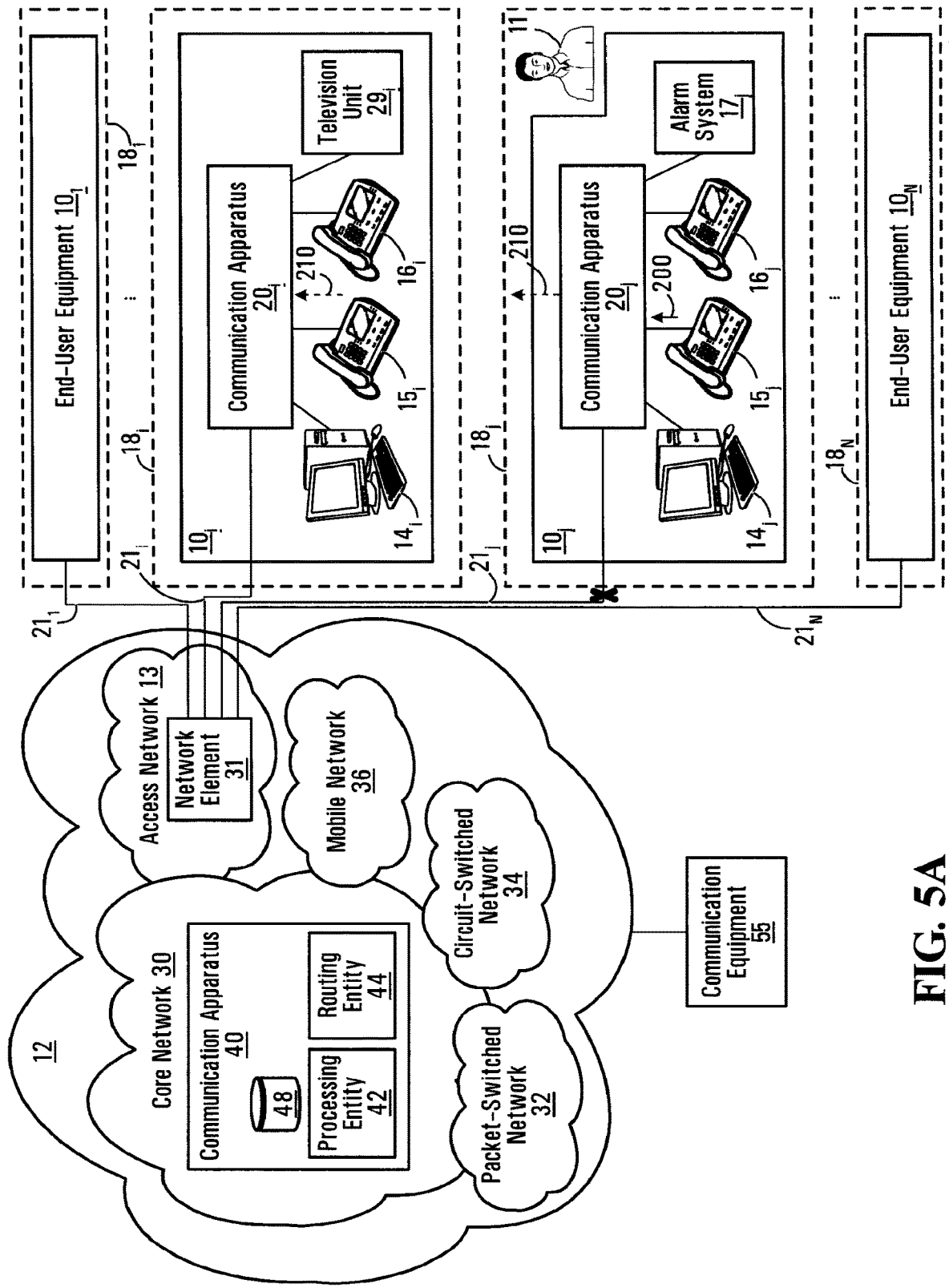
FIGS. 5A and 5B show an example in which a wireless communication link is established between the end-user equipment at a first one of the end-user premises and the end-user equipment at a second one of the end-user premises in order to allow information pertaining to a communication effected using the end-user equipment at the first one of the end-user premises to be exchanged over the communications network, when an ability of the end-user equipment at the first one of the end-user premises to communicate via a communication link connecting the end-user equipment at the first one of the end-user premises to the communications network is disrupted.
Figure 5B:
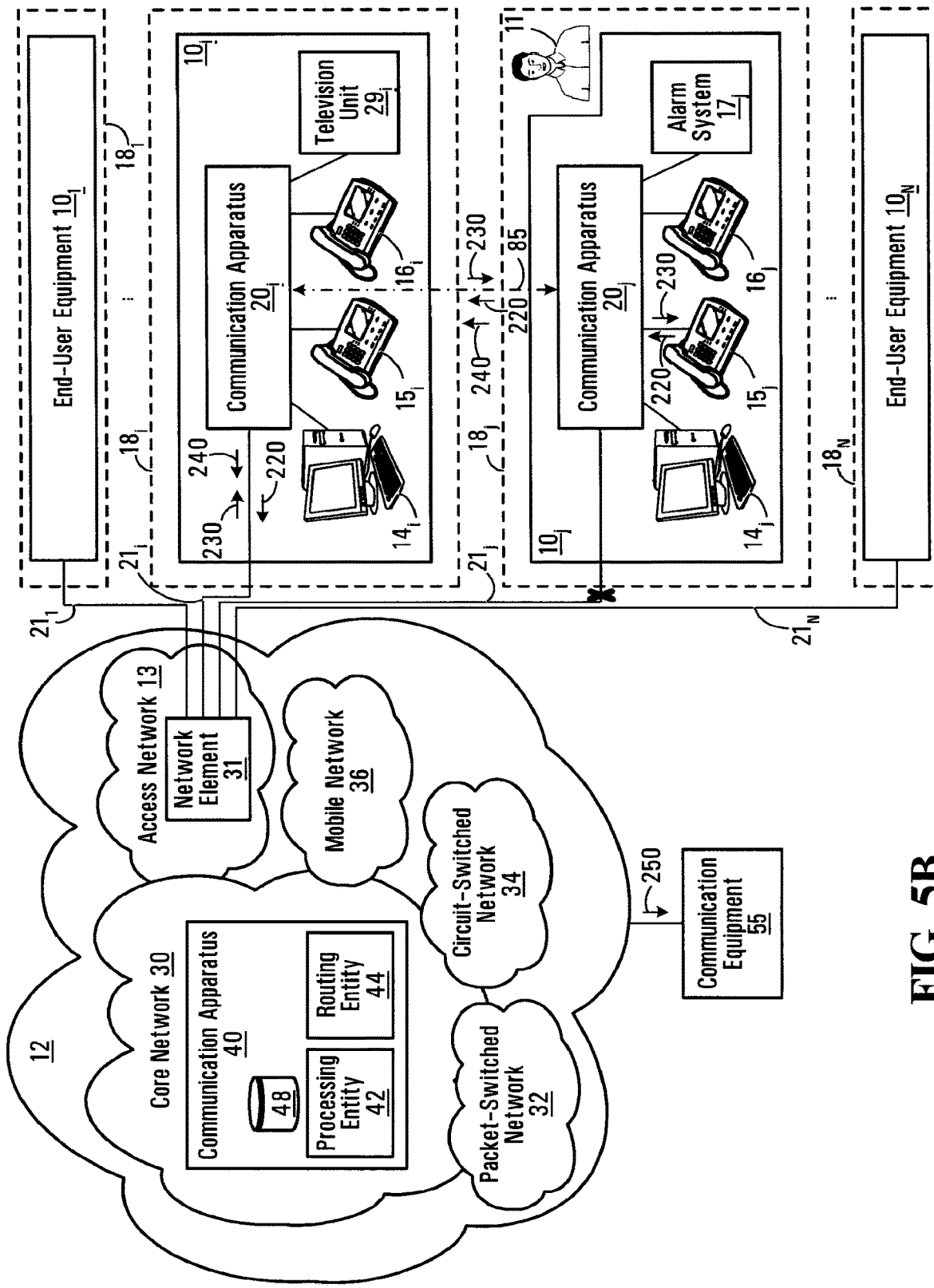

Turning to FIGS. 5A and 5B, an example illustrating how the end-user equipment 10$_x$ at the end-user premise 18$_j$ continues to be able to effect telephone calls, accesses to data network sites, alarm system communications, and/or other communications over the communications network 12 when its ability to communicate via the communication link 21$_j$ reaching the end-user premise 18$_j$ is disrupted, will now be considered.

In this example, the end-user equipment 10$_j$ comprises, in addition to the communication apparatus 20$_j$, a plurality of end-user devices, including a computer 14$_j$, a VoIP phone 15$_j$, a POTS phone 16$_j$, and alarm system devices (e.g., detectors, a controller) of an alarm system 17$_j$, which are connected to the communication apparatus 20$_j$ via its connectors 52$_1$-52$_M$ and/or its wireless interface 80.

At one point in time, a telephone call, an access to a data network site, an alarm system communication, and/or another communication is to be effected by the end-user equipment 10$_j$. The communication is destined for communication equipment 55, which, depending on the nature of the communication, may comprise a telephone, a computer and/or another communication device. More particularly, for purposes of this example, it is assumed that a user 11 at the end-user premise 18$_j$ initiates a telephone call using the VoIP phone 15$_j$. It is further assumed that the communication equipment 55 comprises a telephone for which the telephone call is destined.

As shown in FIG. 5A, the communication apparatus 20$_j$ receives information 200 from the VoIP phone 15$_j$ when the user 11 uses this phone to initiate a telephone call. The information 200 conveys a request for the telephone call being made using the VoIP phone 15$_j$ and is indicative of a destination of the telephone call. For example, the information 200 may include a phone number, SIP data and/or other information that identifies the telephone of the communication equipment 55 for which the telephone call is destined.

The processing entity 54 of the communication apparatus 20$_j$ verifies the ability of the end-user equipment 10$_j$ to communicate via the communication link 21$_j$ to assess whether it is normal or disrupted (i.e., not normal). This verification may be performed in various manners.

For example, in this embodiment, the processing entity 54 of the communication apparatus 20$_j$ verifies a state of the communication link 21$_j$ to assess whether it is operating normally or is disrupted (i.e., not operating normally). The state of the communication link 21$_j$ may be verified in various ways. For instance, in this embodiment, the state of the communication link 21$_j$ may be verified using an exchange of signals along the communication link 21$_j$ between the communication apparatus 20$_j$ and one or more components of the communications network 12, such as the network element 31 of the access network 13 or the core network 30. The communication apparatus 20$_j$ may repeatedly (e.g., periodically) transmit signals along the communication link 21$_j$ to one or more components of the communications network 12 and expect receipt of a given acknowledgement signal from the communications network 12.

Such an exchange of signals can allow the communication apparatus 20$_j$ to verify the state of the communication link 21$_j$ using criteria that determine whether the communication link 21$_j$ is operating normally or is disrupted. In some cases, the criteria may include one or more of the following factors: timeliness (e.g., signals have to be received and/or acknowledged within a particular timeframe); acknowledgement (e.g., a signal received by a component has to be acknowledged by the receiving component with a return signal); quality-of-service (e.g., the receiving component assesses a quality of the received signals to ensure that it conforms with a particular quality of service level). In other cases, the criteria may include other factors.

The state of the communication link 21$_j$ may thus be assessed by determining whether the signals exchanged between the communication apparatus 20$_j$ and the communications network 12 via this link satisfy the criteria. For example, the state of the communication link 21$_j$ may be deemed to be normal if the following criteria are met: the exchange of signals is completed within the expected timeframe (e.g., five (5) seconds); a component having transmitted a signal receives a return signal acknowledging the receipt of the transmitted signal; and/or the exchange of signals is completed within the expected quality-of-service level. In contrast, the state of the communication link 21$_j$ may be deemed to be disrupted based on an exchange where signals are late or missing, signals are unacknowledged by one or more components, and/or the quality of signals exchanged falls below the expected quality-of-service.

While in this embodiment the processing entity 54 of the communication apparatus 20$_j$ verifies the state of the communication link 21$_j$ based on an exchange of signals along the communication link 21$_j$ between the communication apparatus 20$_j$ and one or more components of the communications network 12, processing entity 54 may assess the state of the communication link 21$_j$ in various other ways in other embodiments. For example, in some embodiments, processing entity 54 may determine that the communication link $21_j$ is disrupted based on information received from a source external to the communication apparatus $20_j$ and indicative of a disruption of the communication link $21_j$ (e.g., the communication apparatus 40 in the core network 30 may determine that the communication link $21_j$ is disrupted and cause the end-user equipment $10_j$ at the end-user premise $18_j$ to transmit information received via the wireless interface 70 of the communication apparatus $20_j$ and indicative of a disruption of the communication link $21_j$).

Also, in this embodiment, in addition to verifying the state of the communication link $21_j$, processing entity 54 of the communication apparatus $20_j$ verifies a state of one or more software and/or hardware components (e.g., the modem 60, the network interface 50) of the end-user equipment $10_j$ that are used to effect communications via the communication link $21_j$ in order to assess whether they are operating normally or are disrupted (i.e., not operating normally). For example, processing entity 54 may verify the state of the modem 60 to assess whether it is operating normally or not (e.g., by verifying whether the modem 60 has issued any error code indicative of a malfunction).

For purposes of this example, assume that the ability of the end-user equipment $10_j$ to communicate via the communication link $21_j$ is disrupted. Specifically, in this example, assume that the communication link $21_j$ is disrupted, for instance, due to a cut or other physical damage inflicted to it, and thus cannot be used to reliably exchange information between the end-user equipment $10_j$ and the communications network 12.

Thus, in this embodiment, upon determining that the communication link $21_j$ is disrupted, the processing entity 54 of the communication apparatus $20_j$ attempts to find another way to effect the telephone call being initiated by the user 11 using the VoIP phone $15_j$ over the communications network 12. More particularly, the communication apparatus $20_j$ attempts to implement a failover mechanism in which it attempts to establish a wireless communication link allowing it to effect the telephone call by routing the call to the communications network 12 via this wireless communication link and another one of the communications links $21_l$-$21_N$.

The processing entity 54 of the communication apparatus $20_j$ accesses the database 66 of the communication apparatus $20_j$ to obtain the end-user equipment information 43 regarding end-user equipment at one or more other ones of the end-user premises $18_l$-$18_N$ that is within wireless range of the end-user equipment $10_j$ at the end-user premise $18_j$.

In this example, it is assumed that the end-user equipment information 43 in the database 66 of the communication apparatus $20_j$ includes end-user equipment information regarding the end-user equipment $10_i$ at the end-user premise $18_i$, which is within wireless range of the end-user equipment $10_j$ at the end-user premise 18*j*. The end-user equipment $10_i$ comprises, in addition to the communication apparatus $20_i$, a plurality of end-user devices, including a computer $14_i$, a VoIP phone $15_i$, another VoIP phone $16_i$, and a television unit $29_i$, which are connected to the communication apparatus $20_i$ via its connectors $52_l$-$52_M$ and/or its wireless interface 80. It is also assumed in this example that the end-user equipment information 43 included in the database 66 of the communication apparatus $20_j$ at the end-user premise $20_j$ includes an identifier of the communication apparatus $20_i$ (e.g., a MAC address, EHA, or other hardware identifier of the communication apparatus $20_i$, an IP address assigned to communication apparatus $20_i$, or any other information that identifies the communication apparatus $20_i$) and access information to be provided to the communication apparatus $20_i$ in order to make use of the communication apparatus $20_i$ (e.g., a password or a wireless network key).

While in this example the end-user equipment information 43 in the database 66 pertains only to the end-user equipment $10_i$ at the end-user premise $18_i$, in other examples, the end-user equipment information 43 in the database 66 may include identifiers and access information for end-user equipment at other ones of the end-user premises $18_l$-$18_N$. In such a case, the processing entity 54 of communication apparatus $20_i$ may use a selection process to select one or more of the communication apparatuses $20_l$-$20_N$ listed in the database 66 with which it may attempt to establish a wireless communication link. For example, the selection process may define one or more "preferred" ones of the communication apparatuses $20_l$-$20_N$ listed in the database 66 that are predetermined by one or more components of the communications network 12, such as the communication apparatus 40 of the core network 30. As another example, the selection process may allow the processing entity 54 of the communication apparatus $20_j$ to decide with which of the other ones of the communication apparatuses $20_l$-$20_N$ listed in the database 66 it should attempt to establish a wireless communication link. For instance, the processing entity 54 may evaluate the other ones of the communication apparatuses $20_l$-$20_N$ listed in the database 66 based on criteria such as their physical proximity, wireless signal strength and/or reported network traffic load, and/or other factors. This may allow the communication apparatus $20_j$ to choose to establish a wireless communication link with a different one of the communication apparatuses $20_l$-$20_N$ listed in the database 66 every time the failover mechanism is initiated based on an evaluation of current signal strength and network traffic load.

Upon retrieving the identifier and access information of the communication apparatus 20 the processing entity 54 of the communication apparatus $20_j$ causes the routing entity 62 of the communication apparatus $20_j$ to attempt to establish a wireless communication link between the communication apparatus $20_j$ and the communication apparatus $20_i$. More particularly, the processing entity 54 causes the routing entity 62 to wirelessly transmit information 210 to the communication apparatus $20_j$ via the wireless interface 70 of the communication apparatus $20_i$. The information 210 can be viewed as a request to access the communication apparatus $20_i$. In this example, the information 210 includes the identifier and access information of the communication apparatus $20_i$, as well as the identifier and access information of the communication apparatus $20_j$, which the processing entity 54 retrieved from the end-user equipment information 41 included in the database 66 of the communication apparatus $20_j$.

When it receives the information 210, the communication apparatus $20_i$ attempts to validate the identifier and access information of the communication apparatus $20_i$ that are included in the information 210. More particularly, the processing entity 54 of the communication apparatus $20_i$ verifies whether the identifier and access information of the communication apparatus $20_i$ that are included in the information 210 correspond to the identifier and access information of the communication apparatus $20_i$ that are included in the end-user equipment information 41 in the database 66 of the communication apparatus $20_i$. If not, the communication apparatus $20_x$ may deny the request of the communication apparatus $20_j$ to access the communication apparatus $20_i$ and may take some other action. For instance, the communication apparatus $20_i$ may send information back to the communication apparatus $20_j$ indicating that access to the communication apparatus $20_i$ is denied, and/or may send information to the communication apparatus 40 of the core network 30 to indicate that a failed connection attempt has occurred due to invalid credentials.

In this example, it is assumed that the identifier and access information of the communication apparatus $20_i$ that are included in the information 210 indeed correspond to the identifier and access information of the communication apparatus $20_i$ that are included in the end-user equipment information 41 in the database 66 of the communication apparatus $20_i$. Therefore, as shown in FIG. 5B, the communication apparatus $20_i$ grants access to the communication apparatus $20_j$, resulting in establishment of a wireless communication link 85 between the communication apparatus $20_j$ and the communication apparatus $20_i$.

With the wireless communication link 85 being established, the communication apparatus $20_j$ may proceed to effect the telephone call requested by the user 11 using the VoIP phone $15_j$ over the communications network 12 despite the disruption of the communications link $21_j$.

More particularly, the routing entity 62 of the communication apparatus $20_j$ transmits information 240 pertaining to the telephone call to the communications network 12 via the wireless communication link 85, the communication apparatus $20_i$ and the communication link $21_i$. The information 240 includes the telephone number, SIP data or other information identifying the telephone of the communication equipment 55. In this example, the information 240 also includes the identifier of the communication apparatus $20_j$ and the identifier of the VoIP phone $15_j$ from which the telephone call originates. The information 240 may also include other call control information that may be needed to establish the telephone call.

The communication apparatus 40 of the core network 30 receives the information 240. The processing entity 42 of the communication apparatus 40 determines, based on the telephone number, SIP data or other information included in the information 240, that the telephone call is to be established with the telephone of the communication equipment 55. The processing entity 42 proceeds to cause the routing entity 44 of the communication apparatus 40 to transmit information 250 to the communication equipment 55 to establish the telephone call between the VoIP phone $15_j$ and the telephone of the communication equipment 55.

Once the information 250 is received by the communication equipment 55, a person or automated system (e.g., a voicemail system, an automated voice response system) associated with the communication equipment 55 can answer the telephone call initiated by the user 11. Information pertaining to the telephone call may then be exchanged between the VoIP phone $15_j$ and the communication equipment 55.

More particularly, the routing entity 62 of communication apparatus $20_j$ transmits information 220 pertaining to the telephone call over the communications network 12 via the wireless communication link 85, the communication apparatus $20_i$ and the communication link $21_i$. The information 220 can include information transmitted by the VoIP phone $15_j$, which may include voice information provided by the user 11 during the call, and possibly call control information to maintain the call in progress.

In the other direction, information 230 pertaining to the telephone call and arriving over the communications network 12 may be routed to the communication apparatus $20_j$ via the communication link $21_i$, the communication apparatus $20_i$ and the wireless communication link 85. For example, the information 230 may include call control information transmitted by the communications network 12 to establish and/or maintain the call in progress, and/or voice information provided by the person or automated system associated with the communication equipment 55 during the call.

Thus, information pertaining to the telephone call (such as the information 240, 220, 230) can be exchanged between the communications network 12 and the communication apparatus $20_j$ by "piggybacking" this information on the communications link $21_i$. In this way, the telephone call can still be effected by the user 11 despite the disruption of the communication link $21_j$. This is generally very useful, in particular if the telephone call that the user 11 wants to make is an important call or an emergency call (such as an emergency "911" call) to police, fire and/or ambulance services in an emergency situation.

In some embodiments, the wireless communication link 85 may remain established between the communication apparatus $20_j$ and the communication apparatus $20_j$ until the telephone call is terminated. Upon determining that the telephone call is terminated, the processing entity 54 of the communication apparatus $20_j$ may cause the routing entity 62 of the communication apparatus $20_j$ to wirelessly transmit information to the communication apparatus $20_i$ via the wireless interface 70 of the communication apparatus $20_j$ in order to disestablish the wireless communication link 85.

In other embodiments, the wireless communication link 85 may remain established between the communication apparatus $20_j$ and the communication apparatus $20_i$ until the disruption to the communication link $21_j$ is resolved. In other words, the wireless communication link 85 may remain established even after the termination of the telephone call placed by the user 11 (e.g., to allow the end-user equipment $20_j$ to make other telephone calls and/or other communications, and/or to allow incoming calls and/or other incoming communications to reach the end-user premise $18_j$). When the disruption to the communication link $21_j$ is resolved, the wireless communication link 85 becomes unnecessary and may be disestablished (i.e., terminated). To determine when the communication link $21_j$ is no longer disrupted (i.e., is operating normally once again), the communication apparatus $20_j$ may verify the state of the communication link $21_j$. For example, this verification may be carried out periodically by the communication apparatus $20_j$, possibly more frequently while the communication link $21_j$ is disrupted, in order to detect when the communication link $21_j$ is no longer disrupted. As mentioned above, the state of the communication link $21_j$ may be verified using an exchange of signals between the communication apparatus $20_j$ and the communications network 12. When such an exchange of signals results in the proper criteria being met, the communication apparatus $20_j$ can deem the state of the communication link $21_j$ as being normal (i.e., non-disrupted) once again. Upon concluding that the state of the communication link $21_j$ is once again normal, the processing entity 54 of the communication apparatus $20_j$ may cause the routing entity 62 of the communication apparatus $20_j$ to wirelessly transmit information to the communication apparatus $20_i$ via the wireless interface 70 of the communication apparatus $20_j$ in order to disestablish the wireless communication link 85.

While in the example presented above the ability of the end-user equipment $10_j$ to communicate via the communication link $21_j$ is disrupted due to a disruption to the communication link $21_j$ itself, similar operations may occur when the ability of the end-user equipment $10_j$ to communicate via the communication link $21_j$ is disrupted due to some other reason, such as a defective or inoperative software or hardware component of the end-user equipment $10_j$ (e.g., the modem 60) normally used to effect communications over the communication link $21_j$.

Also, while the example presented above involved a telephone call initiated by the user 11 using the VoIP phone $15_j$, similar operations may occur for other types of communications effected using the end-user equipment $10_j$ at the end-user premise $18_j$.

For example, if the user 11 uses the computer $14_j$ to access one or more data network sites (e.g., web sites) while the ability of the end-user equipment $10_j$ to communicate via the communication link $21_j$ is disrupted, information pertaining to such data network site accesses (e.g., hypertext markup language (HTML) requests and responses) can be transmitted to and from the packet-switched network 32 of the Communications network 12 via the communication apparatus $20_x$, the wireless communication link 85, the communication apparatus $20_i$ and the communication link $21_i$. Other types of communications, such alarm system communications, can be effected in a similar manner.

It will thus be appreciated that, in this embodiment, interaction between the communication apparatus $20_j$ at the end-user premise $18_j$ and the communication apparatus $20_i$ at the end-user premise $18_i$ provides a failover mechanism enabling the end-user equipment $10_j$ at the end-user premise $18_j$ to continue to be able to effect telephone calls, accesses to data network sites, alarm system communications, and/or other communications over the communications network 12, despite the ability of the end-user equipment $10_j$ to communicate via the communication link $21_j$ being disrupted, by "piggybacking" on the communication link $21_i$ reaching the end-user premise $18_i$. In this way, telephone, data network (e.g., Internet), alarm system, television and/or other communication services may continue to be provided to the subscriber associated with the end-user premise $18_j$ in an uninterrupted fashion, regardless of the ability of the end-user equipment $10_j$ to communicate via the communication link $21_j$ reaching the end-user premise $18_j$.

The failover mechanism contemplated herein may be implemented in various other ways in other embodiments.

For example, in some embodiments, one or more end-user devices of the end-user equipment $10_x$ at the end-user premise $18_x$ may have wireless capabilities that can be exploited to implement the failover mechanism contemplated herein.

Figure 6A:
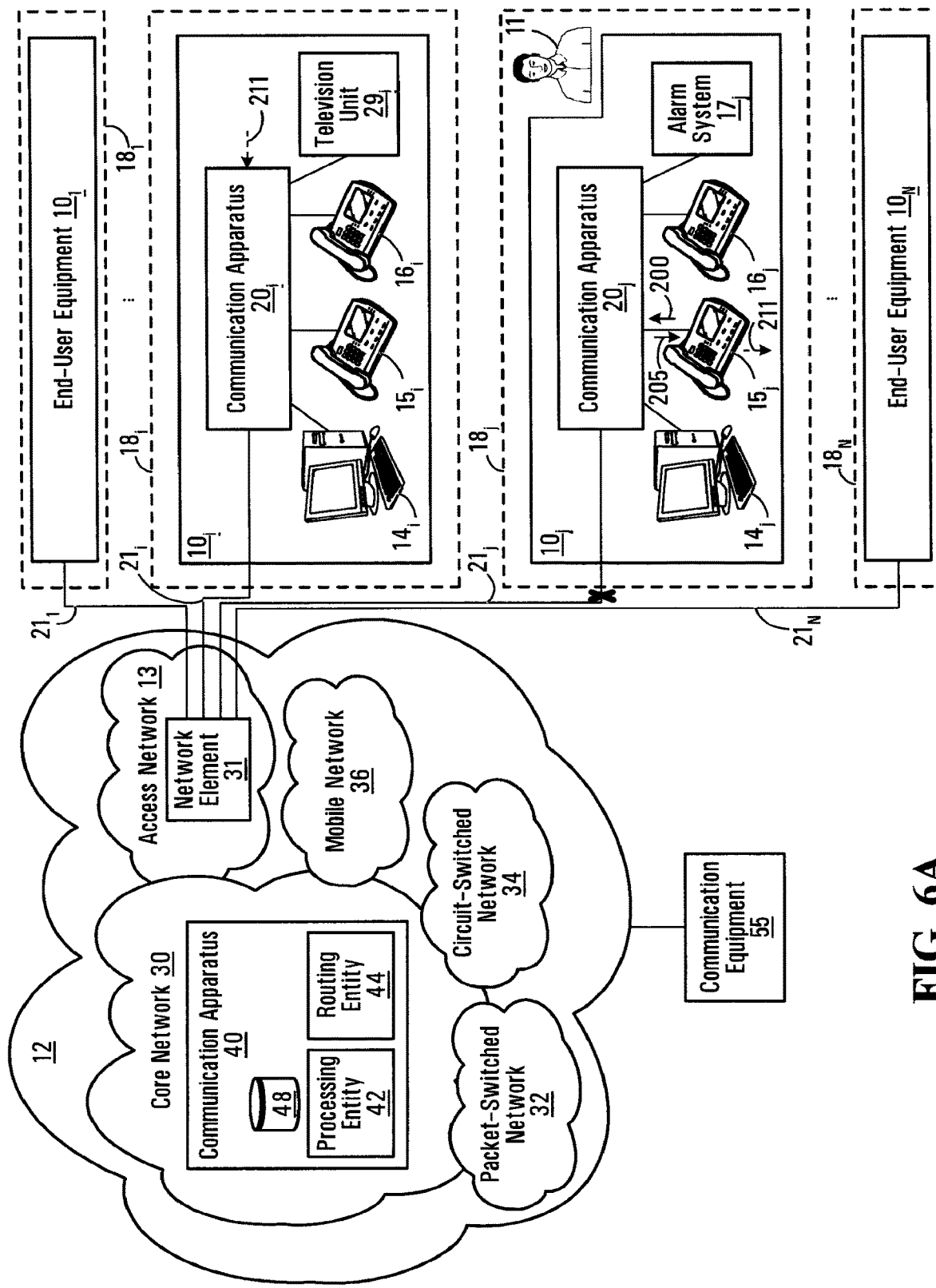
FIGS. 6A and 6B show a variant to the example considered in FIGS. 5A and 5B.

With reference to FIG. 6A, a variant to the example considered above will be discussed in which it is assumed that the VoIP phone $15_j$ used by the user 11 to place the telephone call is a wireless VoIP phone.

As in the example considered above, when the user 11 initiates the telephone call using the VoIP phone $15_j$, the communication apparatus $20_j$ receives the information 200 from the VoIP phone $15_j$ conveying the request for the telephone call and including the telephone number, SIP data or other information identifying the telephone of the communication equipment 55 for which the telephone call is destined. Also as in the example considered above, the communication apparatus $20_j$, upon verifying the state of the communication link $21_j$, determines that the communication link $21_j$ is disrupted (i.e., not operating normally).

Upon determining that the communication link $21_j$ is disrupted, the processing entity 54 of the communication apparatus $20_j$ attempts to find another way to effect the telephone call being initiated by the user 11 using the VoIP phone $15_j$ over the communications network 12. More particularly, the communication apparatus $20_j$ attempts to implement a failover mechanism in which it attempts to establish a wireless communication link allowing it to effect the telephone call by routing the call to the communications network 12 via this wireless communication link and another one of the communications links $21_1$-$21_N$.

The processing entity 54 of the communication apparatus $20_j$ accesses the database 66 of the communication apparatus $20_x$ to obtain the end-user equipment information 43 regarding end-user equipment at one or more other ones of the end-user premises $18_1$-$18_N$ that is within wireless range of the end-user equipment $10_j$ at the end-user premise $18_j$.

As in the example considered above, in this variant example, it is assumed that the end-user equipment information 43 in the database 66 of the communication apparatus $20_j$ includes an identifier of the communication apparatus $20_i$ (e.g., a MAC address, EHA, or other hardware identifier of the communication apparatus $20_i$, an IP address assigned to the communication apparatus $20_i$, or any other information that identifies the communication apparatus $20_i$) and access information to be provided to the communication apparatus $20_i$ in order to make use of the communication apparatus $20_i$ (e.g., a password or a wireless network key).

The processing entity 54 of the communication apparatus $20_j$ retrieves the identifier and access information of the communication apparatus $20_i$. In the embodiment considered above, the communication apparatus $20_j$ uses this identifier and access information to establish the wireless communication link 85 between itself and the communication apparatus $20_i$. In this variant, however, the communication apparatus $20_j$ attempts to cause establishment of a wireless communication link between the VoIP phone $15_j$ and the communication apparatus $20_i$ instead.

More particularly, the routing entity 62 of the communication apparatus $20_j$ transmits information 205 to the VoIP phone $15_j$. The information 205 includes the identifier and access information for the communication apparatus $20_i$ retrieved from the database 66 as well as an indication to establish a wireless communication link between itself, i.e., the VoIP phone $15_j$, and the communication apparatus $20_i$.

Upon receipt of the information 205, the VoIP phone $15_j$ wirelessly sends information 211 to the communication apparatus $20_i$. The information 211 includes the identifier and access information of the communication apparatus $20_i$ that was retrieved from the database 66 by the communication apparatus $20_j$. In this example, the information 211 also includes an identifier of the VoIP phone $15_j$ (e.g., a MAC address, EHA, or other hardware identifier of the VoIP phone $15_j$, an IP address assigned to the VoIP phone $15_j$, or any other information that identifies the VoIP phone $15_j$) and may also include access information to be provided to the VoIP phone $15_j$ in order to make use of the VoIP phone $15_j$ (e.g., a password or a wireless network key).

When it receives the information 211, the communication apparatus $20_i$ attempts to validate the identifier and access information of the communication apparatus $20_i$ that are included in the information 211. More particularly, the processing entity 54 of the communication apparatus $20_i$ verifies whether the identifier and access information of the communication apparatus $20_i$ that are included in the information 211 correspond to the identifier and access information of the communication apparatus $20_i$ that are included in the end-user equipment information 41 in the database 66 of the communication apparatus $20_i$. If not, the communication apparatus $20_i$ may deny the request of the VoIP phone $15_j$ to access the communication apparatus $20_i$ and may take some other action. For instance, the communication apparatus $20_i$ may send information back to the VoIP phone $15_j$ indicating that access to the communication apparatus $20_i$ is denied, and/or may send information to the communication apparatus 40 of the core network 30 to indicate that a failed connection attempt has occurred due to invalid credentials.

Figure 6B:
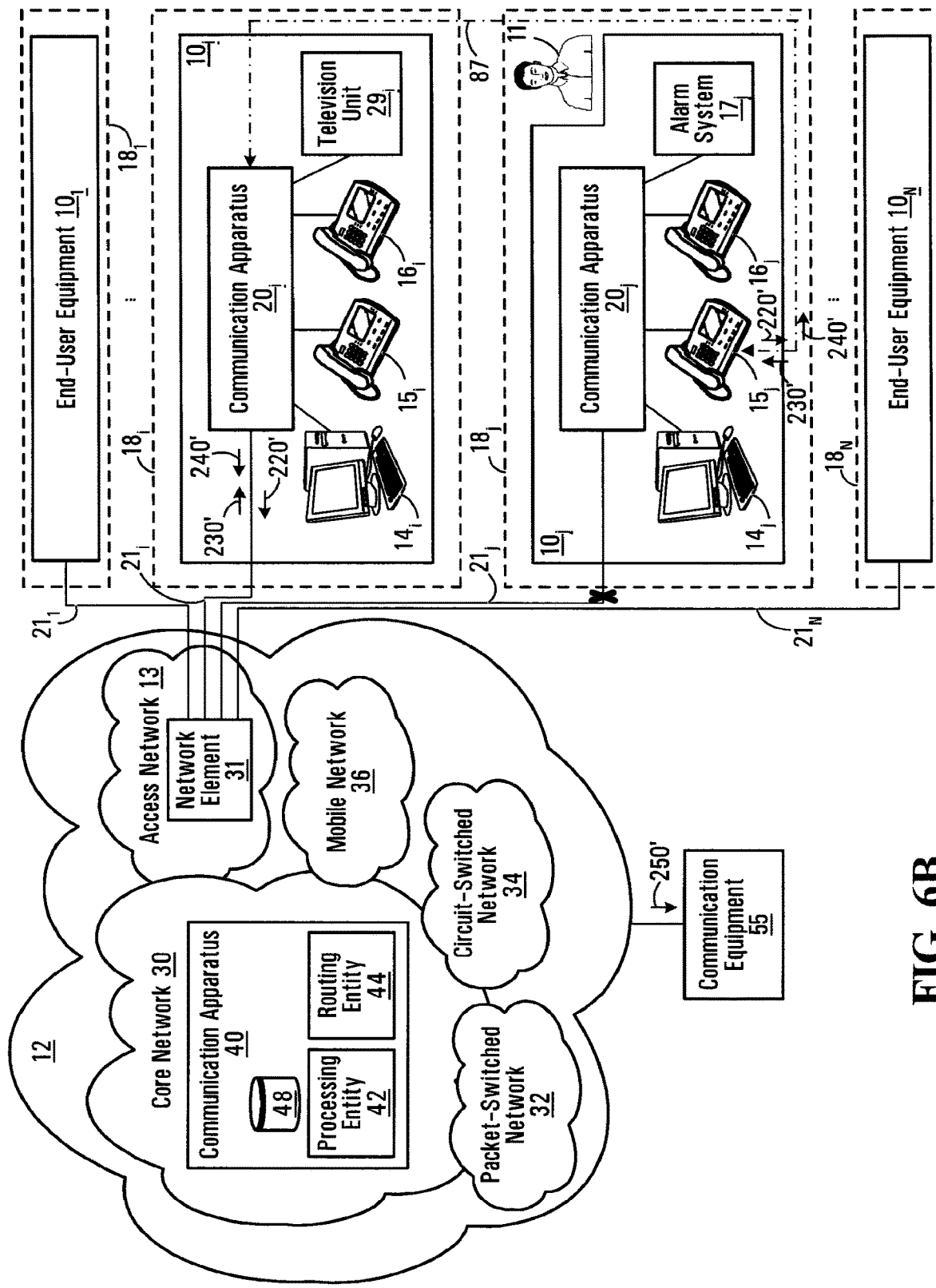

In this example, it is assumed that the identifier and access information of the communication apparatus $20_i$ that are included in the information 211 indeed correspond to the identifier and access information of the communication apparatus $20_x$ that are included in the end-user equipment information 41 in the database 66 of the communication apparatus $20_i$. Therefore, as shown in FIG. 6B, the communication apparatus $20_i$ grants access to the VoIP phone $15_j$, resulting in establishment of a wireless communication link 87 between the VoIP phone $15_j$ and the communication apparatus $20_i$.

With the wireless communication link 87 being established, the VoIP phone $15_j$ may proceed to effect the telephone call requested by the user 11 using the VoIP phone 15j over the communications network 12 despite the disruption to the communications link $21_{j'}$.

More particularly, the VoIP phone $15_j$ transmits information 240' pertaining to the telephone call to the communications network 12 via the wireless communication link 87, the communication apparatus $20_i$ and the communication link $21_i$. The information 240' includes the telephone number, SIP data or other information identifying the telephone of the communication equipment 55. In this example, the information 240 also includes the identifier of the identifier of the VoIP phone $15_j$ from which the telephone call originates. The information 240' may also include other call control information that may be needed to establish the telephone call.

The communication apparatus 40 of the core network 30 receives the information 240'. The processing entity 42 of the communication apparatus 40 determines, based on the telephone number, SIP data or other information included in the information 240', that the telephone call is to be established with the telephone of the communication equipment 55. The processing entity 42 proceeds to cause the routing entity 44 of the communication apparatus 40 to transmit information 250' to the communication equipment 55 to establish the telephone call between the VoIP phone $15_j$ and the telephone of the communication equipment 55.

Once the information 250' is received by the communication equipment 55, a person or automated system (e.g., a voicemail system, an automated voice response system) associated with the communication equipment 55 can answer the telephone call initiated by the user 11. Information pertaining to the telephone call may then be exchanged between the VoIP phone $15_j$ and the communication equipment 55.

More particularly, the VoIP phone $15_j$ transmits information 220' pertaining to the telephone call over the communications network 12 via the wireless communication link 87, the communication apparatus $20_i$ and the communication link $21_i$. The information 220' may include voice information provided by the user 11 during the call and possibly call control information to maintain the call in progress.

In the other direction, information 230' pertaining to the telephone call and arriving over the communications network 12 may be routed to the VoIP phone $15_j$ via the communication link $21_i$, the communication apparatus $20_x$ and the wireless communication link 87. For example, the information 230' may include call control information transmitted by the communications network 12 to establish and/or maintain the call in progress, and/or voice information provided by the person or automated system associated with the communication equipment 55 during the call.

Thus, information pertaining to the telephone call (such as the information 240', 220', 230') can be exchanged between the communications network 12 and the VoIP phone $15_j$ by "piggybacking" this information on the communications link $21_x$. In this way, the telephone call can still be effected by the user 11 despite the disruption of the communication link $21_{j'}$.

While this embodiment illustrates one way in which the failover mechanism contemplated herein may be implemented using wireless capabilities of one or more end-user devices of the end-user equipment $10_x$ at the end-user premise $18_x$, such wireless capabilities may be exploited in other ways in other embodiments to implement the failover mechanism.

For example, in some embodiments, when the ability of the end-user equipment $10_x$ to communicate via the communication link $21_x$ reaching the end-user premise $18_x$ is determined to be disrupted, the communication apparatus $20_x$ at the end-user premise $18_x$ may establish a wireless communication link with a wireless-enabled end-user device that is part of the end-user equipment $10y$ at the end-user premise $18y$ rather than with the communication apparatus $20_y$ directly. For instance, in the example considered above, the communication apparatus $20_j$ at the end-user premise $18_j$ may establish a wireless communication link between itself and the computer $14_i$, the VoIP phone $15_i$, or the VoIP phone $16_i$ (using an identifier and possibly access information for that end-user device retrieved from the database 66 of the communication apparatus $20_j$), such that information pertaining to the telephone call requested by the user 11 using the VoIP phone $15_j$ may be exchanged between the VoIP phone $15_j$ and the communication network 12 via this wireless communication link, the communication apparatus $20_i$ and the communication link $21_i$.

As another example, in some embodiments, when the ability of the end-user equipment $10_x$ to communicate via the communication link $21_x$ reaching the end-user premise $18_x$ is determined to be disrupted, the communication apparatus $20_x$ at the end-user premise $18_x$ may establish a wireless communication link between a wireless-enabled end-user device that is part of the end-user equipment $10_x$ and a wireless-enabled end-user device that is part of the end-user equipment $10_y$ at the end-user premise $18_y$. For instance, in the example considered above, the communication apparatus $20_j$ at the end-user premise $18_j$ may establish a wireless communication link between the VoIP phone $15_j$ and the computer $14_i$, the VoIP phone $15_i$, or the VoIP phone $16_i$ (using an identifier and possibly access information for that end-user device retrieved from the database 66 of the communication apparatus $20_j$), such that information pertaining to the telephone call requested by the user 11 using the VoIP phone $15_j$ may be exchanged between the VoIP phone $15_j$ and the communication network 12 via this wireless communication link, the communication apparatus $20_i$ and the communication link $21_i$.

Although the embodiments considered above relate to telephone calls, accesses to date network sites, alarm system communications, and/or other communications that originate from the end-user equipment $10_x$, it will be appreciated that the failover mechanism contemplated herein may also apply to communications (e.g., incoming telephone calls) that originate elsewhere, arrive over the communications network 12 and are destined for the end-user equipment $10_x$. In particular, in some embodiments, the communication apparatus $20_x$ may repeatedly verify the ability of the end-user equipment $10_x$ to communicate via the communication link $21_x$ to assess whether it is normal or disrupted (i.e., not normal), and not only when a request for a communication is made using the end-user equipment $10_x$, in order to detect a disruption of this ability as soon as possible after it occurs. Such rapid detection can allow the failover mechanism to be invoked as soon as possible after the disruption of the ability of the end-user equipment $10_x$ to communicate via the communication link $21_x$, thus allowing incoming communications to reach the end-user equipment $10_x$ in an uninterrupted fashion.

In the embodiments considered above, the communication apparatus $20_x$ at the end-user premise $18_x$ determines that the ability of the end-user equipment $10_x$ to communicate via the communication link $21_x$ reaching the end-user premise $18_x$ is disrupted (i.e., not normal) and proceeds to establish a wireless communication link between the end-user equipment $10_x$ at the end-user premise $18_x$ and the end-user equipment $10_y$ at the end-user premise $18_y$. In other embodiments, such functions may be implemented by other pieces of equipment of the end-user equipment $10_x$ at the end-user premise $18_x$ and/or of the communications network 12.

For example, in some embodiments, a given end-user device (e.g., a phone, computer, or alarm system device) at the end-user premise $18_x$ may itself determine that the ability of the end-user equipment $10_x$ to communicate via the communication link $21_x$ is disrupted (i.e., not normal) and proceed to implement the failover mechanism contemplated herein. In such embodiments, the given end-user device constitutes an apparatus implementing a processing entity and a routing entity operating in a manner similar to the processing entity 54 and the routing entity 62 of the communication apparatus $20_x$ in connection with the failover mechanism contemplated herein. For instance, in a variant to the example considered above, the wireless VoIP phone $15j$ may determine that the communication apparatus $20_j$ is inoperative or malfunctioning or that the communication link $21_j$ is down (e.g., based on signals or lack of signals between the VoIP phone $15_j$ and the communication apparatus $20_j$). In such a variant, the wireless VoIP phone $15_j$ may store the identifier and access information of the communication apparatus $20_i$ in memory or request them from the database 66 of the communication apparatus $20_j$ and may use this information to establish a wireless communication link (such as the wireless communication link 87) in a manner similar to that described above.

As another example, in some embodiments, a disruption of the ability of the end-user equipment $10_x$ to communicate via the communication link $21_x$ may be determined by an apparatus of the communication network 12 (such as the communication apparatus 40 or the network element 31).

For instance, in one embodiment, the communications network 12 (and more particularly, the access network 13 or the core network 30) sends "heartbeat" signals to each of the communication apparatuses $20_1$-$20_N$ via the communication links $21_1$-$21_N$. When the communication link $21_x$ reaching the end-user premise $18_x$ and the communication apparatus $20_x$ at the end-user premise $18_x$ are operating normally, the communication apparatus $20_x$ receives a heartbeat signal from the communications network 12 and acknowledges its receipt by replying with a similar signal.

Because the communications network 12 sends the heartbeat signals to each of the communications apparatuses $20_1$-$20_N$ via the communication links $21_1$-$21_N$, the communications network 12 is able to identify potential disruptions to the respective abilities of the end-user equipment $10_1$-$10_N$ to communicate via these communication links by looking for certain ones of these communications apparatuses that have not replied to these heartbeat signals. Such a disruption may be determined by one or more components of the communications network 12, such as the network element 31 or another apparatus of the access network 13 and/or the communication apparatus 40 or another apparatus of the core network 30.

For instance, consider a variant to the example considered previously in which it is assumed that the communications network 12, and more particularly, the communication apparatus 40, identifies the disruption of the communication link $21_j$ reaching the end-user premise $18_j$ because "heartbeat" signals sent to the communication apparatus $20_j$ go unacknowledged. Further assume that the communication apparatus $20_k$ does not determine that the link $21_j$ is disrupted.

This results in a situation where the end-user equipment $10_j$ may not be able to effect telephone calls, accesses to data network sites, alarm system communications and/or other communications since the communication apparatus $20_j$ has not determined that the communication link $21_j$ is disrupted. In particular, this may present risks, especially if the user 11 or someone else at the end-user premise $18_j$ needs to effect an important or emergency (e.g., 911) call to alert civic services (such as fire, police and ambulance services) or if the alarm system $17_j$ needs to effect an alarm system communication potentially indicative of an undesirable event (e.g., an intrusion or a fire at the end-user premise $18_x$). Also, the end-user equipment $10_j$ may be unable to receive incoming calls and/or other incoming communications.

To address this situation, in this embodiment, the communication apparatus 40 can try to alert the communication apparatus $20_j$ to the disruption of the communication link $21_j$ using the failover mechanism contemplated herein. For example, the communication apparatus 40 may try to contact the communication apparatus $20_i$ using the communication apparatus $20_i$ at the end-user premise $18_i$.

More particularly, in this embodiment, the processing entity 42 of the communication apparatus 40 retrieves the identifier and access information of the communication apparatus $20_j$ from the database 48 (which, in this embodiment, includes this access information). Once the processing entity 42 has performed this retrieval, the routing entity 44 of the communication apparatus 40 causes information including the identifier and access information of the communication apparatus $20_j$ to be transmitted to the communication apparatus $20_i$ via the communication link $21_i$. Alternatively, the processing entity 42 may cause the routing entity 44 to transmit to the communication apparatus $20_i$ via the communication link $21_i$ information instructing the processing entity 54 of the communication apparatus $20_i$ to retrieve the identifier and access information of the communication apparatus $20_j$ from the database 66 of the communication apparatus $20_i$. In any event, the information transmitted to the communication apparatus $20_i$ also includes an indication for the communication apparatus $20_i$ to establish a wireless communication link between itself and the communication apparatus $20_j$.

Upon receiving the information, the communication apparatus $20_i$ proceeds to establish a wireless communication link between itself and the communication apparatus $20_j$ using the identifier and access information of the communication apparatus $20_j$. With this wireless communication link being established, when incoming and/or outgoing telephone calls, accesses to data network sites, alarm system communications, and/or other communications are to be effected using the end-user equipment $10_j$ at the end-user premise $18_j$, the communication apparatus $20_j$ proceeds to exchange information pertaining to these communications over the communications network 12 via the established wireless communication link, the communication apparatus $20_i$ and the communications link $21_i$ in a manner similar to that described previously herein.

Thus, an apparatus of the communications network 12 (such as the communication apparatus 40 or the network element 31) may be able to identify disruptions of the respective abilities of the end-user equipment $10_1\text{-}10_N$ to communicate via the communications links $21_1\text{-}21_N$ and implement failover operations to allow the end-user equipment $10_1\text{-}10_N$ at the end-user premises $18_1\text{-}18_N$ to continue to be used to effect communications despite these disruptions.

Also, by having the communications network 12 manage certain aspects of the failover mechanism contemplated herein, the communications network 12 may use other information at its disposal to manage these aspects. For example, when the ability of the end-user equipment $10_x$ to communicate via the communication link $21_x$ reaching the end-user premise $18_x$ is determined to be disrupted, the communications network 12 may evaluate the current network traffic load being experienced by individual ones of the communication apparatuses $20_1\text{-}20_N$ within the particular geographic area around the end-user premise $18_x$. This evaluation may allow the communications network 12 to identify opportunities arising from "piggybacking" information onto one or more of the communications links $21_1\text{-}21_N$ that are currently experiencing low network traffic loads and therefore have more available resources than those links experiencing high network traffic loads. This may allow the failover mechanism to be used more efficiently among the communications apparatuses $20_1\text{-}20_N$ within a geographic area, possibly ensuring a higher and more consistent level of service to all users within this area. For instance, assume that the communication network 12 identifies the communication apparatuses $20_y$ and $20_z$ as two (2) apparatuses with acceptable signal strength proximate to the communication apparatus $20_x$ of the end-user equipment $10_x$ whose ability to communicate via the communication link $21_x$ is determined to be disrupted, with the communication apparatus $20_y$ currently experiencing a high network traffic load due to several ongoing communications made by the end-user equipment $10_y$ at the end-user premises $18_y$ while the communication apparatus $20_z$ is experiencing a very low traffic load since few or no communications are being made by the end-user equipment $10_z$ at the end-user premise $18_z$. In such a case, the communications network 12 may direct the communication apparatus $20_z$ to establish a wireless communication link with the communication apparatus $20_x$ since the communication apparatus $20_z$ and thus the communication link $21_z$ provides a greater capacity. In addition to or alternatively to considering network traffic loads, other factors may be taken into consideration by the communications network 12 to determine with which of the end-user equipment $10_1\text{-}10_N$ the end-user equipment $10_x$ is to establish a wireless communication link, such as reported signals strengths of signals exchanged between the end-user equipment $10_1\text{-}10_N$.

In some embodiments, the end-user equipment $10_x$ at the end-user premise $18_x$ may use a private network address space for one or more end-user devices of the end-user equipment $10_x$, while the communication apparatus $20_x$ may communicate via the communication link $21_x$ using a public network address space. For example, the communication apparatus $20_x$ may be assigned a public IP address by the communications network 12 (e.g., by the communication apparatus 40 of the core network 30) and the one or more end-user devices of the end-user equipment $10_x$ may be assigned private IP addresses by the communication apparatus $20_x$. In such embodiments, the routing entity 62 of the communication apparatus $20_x$ performs a network address translation (NAT) process on data packets passing therethrough to translate their addresses from the private network address space to the public network address space, and vice versa.

When the failover mechanism contemplated herein is invoked in these embodiments, in cases where a wireless communication link is established between the communication apparatus $20_x$ at the end-user premise $18_x$ and the communication apparatus $20_y$ at the end-user premise $18_y$, the NAT process performed by the communication apparatus $20_x$ and, if applicable, the NAT process performed by the communication apparatus $20_y$ can take into account the establishment of the wireless communication link in order to avoid potential private network address clashes.

For example, considering the previous example discussed in connection with FIGS. 5A and 5B where the wireless communication link 85 is established between the communication apparatus $20_j$ at the end-user premise $18_j$ and the communication apparatus $20_i$ at the end-user premise $18_x$ upon the user 11 initiating the telephone call while the communication link $21_j$ is disrupted, it is assumed that (prior to the wireless communication link 85 being established) the computer $14_j$, the VoIP phone $15_j$, an ATA associated with the POTS phone $16_j$, and the alarm system devices of the alarm system $17_j$ are assigned private IP addresses by the communication apparatus $20_j$ which is itself assigned a public IP address by the communications network 12, and that the computer $14_i$, the VoIP phone $15_i$, the VoIP phone $16_i$ and the television unit $29_i$ are assigned private IP addresses by the communication apparatus $20_x$ which is itself assigned a public IP address by the communications network 12. More particularly, for purposes of this example, assume that the public IP address assigned to the communication apparatus $20_j$ is "122.1.17.6", the private IP address assigned to the VoIP phone $15_j$ is "10.2.2.9", and the public IP address assigned to the communication apparatus $20_i$ is "122.28.5.18".

In establishing the wireless communication link 85, the routing entity 62 of the communication apparatus $20_i$, assigns a private IP address to the communication apparatus $20_j$, say "10.50.50.3" for purposes of this example. In other words, the communication apparatus $20_j$ can be viewed as becoming part of the private network address space used by the end-user equipment $10_i$ at the end-user premise $18_j$. The routing entity 62 of the communication apparatus $20_j$ takes note of the private IP address "10.50.50.3" assigned to it by the communication apparatus $20_j$.

Upon receiving data packets transmitted by the VoIP phone $15_j$ which have the private IP address "10.2.2.9" as their source address, the routing entity 62 of the communication apparatus $20_j$ performs the NAT process on these data packets. As part of the NAT process, the routing entity 62 notes destination addresses and possibly destination ports of the data packets in a database (e.g., a connection state table) and sends to the communication apparatus $20i$ modified versions of the data packets such that they have the private IP address "10.50.50.3" as their source address.

The routing entity 62 of the communication apparatus $20_i$ receives the data packets transmitted by the communication apparatus $20_j$ which have the private IP address "10.50.50.3" as their source address and proceeds to perform the NAT process on these data packets. As part of the NAT process, the routing entity 62 notes destination addresses and possibly destination ports of the data packets in a database (e.g., a connection state table) and sends over the communications network 12 via the communication link $21_i$ modified versions of the data packets such that they have the public IP address "122.28.5.18" as their source address.

In the reverse direction, when the communication apparatus $20_i$ receives via the communication link $21_i$ data packets pertaining to the telephone call which have the public IP address "122.28.5.18" as their destination address, the routing entity 62 of the communication apparatus $20_i$ performs the NAT process on these data packets by consulting the aforementioned database (e.g., connection state table) based on their source addresses and optionally source ports and sends to the communication apparatus $20_j$ modified versions of these data packets such that they have the private IP address "10.50.50.3" as their destination address.

The routing entity 62 of the communication apparatus $20_j$ receives the data packets transmitted by the communication apparatus $20_i$ which have the private IP address "10.50.50.3" as their destination address and proceeds to perform the NAT process on these data packets by consulting the aforementioned database (e.g., connection state table) based on their source addresses and optionally source ports. This results in the routing entity 62 sending to the VoIP phone $15_j$ modified versions of the data packets such that they have the private IP address "10.10.2.9" as their destination address.

While the embodiment considered above illustrates one way in which NAT may be taken into account in implementing the failover mechanism contemplated herein, NAT may be taken into account in various other ways in other embodiments. Also, in some embodiments, NAT may not be needed and/or may not be performed (e.g., in cases where an IPv6 addressing scheme is used).

Those skilled in the art will appreciate that, in some embodiments, certain functionality of a given element described herein (e.g., the communication apparatus 40, any piece of equipment of the end-user equipment $10_x$ such as the communication apparatus $20_x$) may be implemented as pre-programmed hardware or firmware components (e.g., application specific integrated circuits (ASICs), electrically erasable programmable read-only memories (EEPROMs), etc.) or other related components. In other embodiments, a given element described herein (e.g., the communication apparatus 40, any piece of equipment of the end-user equipment $10_x$ such as the communication apparatus $20_x$) may comprise a processor having access to a memory which stores program instructions for execution by the processor to implement certain functionality of that given element. The program instructions may be stored on data storage media that is fixed, tangible, and readable directly by the processor. The data storage media may store data optically (e.g., an optical disk such as a CD-ROM or a DVD), magnetically (e.g., a hard disk drive, a removable diskette), electrically (e.g., semiconductor memory, floating-gate transistor memory, etc.), and/or in various other ways. Alternatively, the program instructions may be stored remotely but transmittable to the given element via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the invention have been described and illustrated, it will be apparent to those skilled in the art that numerous modifications and variations can be made without departing from the scope of the invention, which is defined in the appended claims.

The invention claimed is:

1. A communication apparatus at a first location comprising:
   a wired interface for providing a first communication link connecting the communication apparatus to a communications network;
   a first wireless interface for connecting the communication apparatus to at least one user device of first end-user equipment at the first location; and
   a second wireless interface for connecting the communication apparatus to a second communication apparatus at a second location;
   a processing entity configured to determine that an ability to communicate via the first communication link is disrupted; and
   a routing entity configured to:
      in response to determining that the ability to communicate via the first communication link is disrupted, cause the communication apparatus device at the first location and second communication apparatus at the second location to wirelessly exchange certain information to establish a wireless communication link using the second wireless interface; and
      cause information of a communication session to be exchanged between the at least one user device of first end-user equipment and the communications network via the wireless communication link established between the communication apparatus at the first location and the second communication apparatus at the second location,
   wherein the second communication apparatus has second communication link connecting the second communication apparatus to the communications network.

2. The apparatus as claimed in claim 1, wherein, to determine that the ability of the at least one user device of the first end-user equipment at the first location to communicate via the first communication link is disrupted, said processing entity is configured to verify the ability of the communication apparatus to communicate via the first communication link.

3. The apparatus as claimed in claim 2, wherein, to verify the ability of the at least one user device of the first end-user equipment at the first location to communicate via the first communication link, said processing entity is configured to:
   perform a verification of a state of the first communication link based on a signal conveyable via the first communication link; and
   determine that the first communication link is disrupted based on a result of the verification.

4. The apparatus as claimed in claim 3, wherein, to determine that the first communication link is disrupted based on the result of the verification, said processing entity is configured to determine that the signal is not received within a period of time or does not satisfy a quality-of-service condition.

5. The apparatus as claimed in claim 2, wherein, to verify the ability of the at least one user device of first end-user equipment at the first location to communicate via the first communication link, said processing entity is configured to:
   perform a verification of a state of a software or hardware component of the at least one user device of first end-user equipment at the first location; and
   determine that the software or hardware component is disrupted based on a result of the verification.

6. The apparatus as claimed in claim 1, wherein, to determine that that the ability of the at least one user device of first end-user equipment at the first location to communicate via the first communication link is disrupted, said processing entity is configured to receive information indicative of a disruption of the ability of the at least one user device of first end-user equipment at the first location to communicate via the first communication link.

7. The apparatus as claimed in claim 6, wherein the information indicative of a disruption of the ability of the at least one user device of first end-user equipment at the first location to communicate via the first communication link comprising information indicative of a disruption of the first communication link.

8. The apparatus as claimed in claim 1, wherein the certain information comprises an identifier of the second communication apparatus at the second location.

9. The apparatus as claimed in claim 8, wherein the identifier of the second communication apparatus comprises at least one of a hardware identifier and an IP address.

10. The apparatus as claimed in claim 9, wherein the hardware identifier comprises at least one of a MAC address and an Ethernet hardware address.

11. The apparatus as claimed in claim 8, wherein the certain information comprises access information for the second communication apparatus at the second location.

12. The apparatus as claimed in claim 11, wherein the access information for the second communication apparatus at the second location comprises at least one of a password and a wireless network key.

13. The apparatus as claimed in claim 11, wherein the certain information comprises an identifier of the communication apparatus device at the first location.

14. The apparatus as claimed in claim 13, wherein each of the identifier of the communication apparatus device at the first location and the identifier of the second communication apparatus at the second location comprises at least one of a hardware identifier and an IP address.

15. The apparatus as claimed in claim 14, wherein the hardware identifier comprises at least one of a MAC address and an Ethernet hardware address.

16. The apparatus as claimed in claim 13, wherein the certain information comprises access information for the communication apparatus device at the first location.

17. The apparatus as claimed in claim 16, wherein each of the access information for the communication apparatus device at the first location and the access information for the second communication apparatus at the second location comprises at least one of a password and a wireless network key.

18. The apparatus as claimed in claim 1, wherein said processing entity is configured to receive, prior to determining that the ability to communicate via the first communication link is disrupted, a request for the communication to be effected over the communications network from the at least one user device of first end-user equipment at the first location.

19. The apparatus as claimed in claim 1, wherein the communication is one of:
   a telephone call effected using the at least one user device of first end-user equipment at the first location;
   an access to a data network site effected using the at least one user device of first end-user equipment at the first location; and
   an alarm system communication effected using the at least one user device of first end-user equipment at the first location.

* * * * *